(12) United States Patent
Hayashi

(10) Patent No.: US 6,233,214 B1
(45) Date of Patent: May 15, 2001

(54) INFORMATION DATA RECORDING/REPRODUCING METHOD

(75) Inventor: Hideki Hayashi, Tsurugashima (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/184,739

(22) Filed: Nov. 3, 1998

(30) Foreign Application Priority Data

Nov. 6, 1997 (JP) .................................................. 9-304745

(51) Int. Cl.$^7$ ...................................................... G11B 5/76
(52) U.S. Cl. ................................... 369/59.23; 369/124.02
(58) Field of Search ........................... 369/32, 33, 44.26, 369/44.28, 44.34, 47.2, 47.22, 47.35, 47.15, 47.16, 59.21, 59.23, 59.27, 124.02, 124.09

(56) References Cited

U.S. PATENT DOCUMENTS 4,932,015 * 6/1990 Nagashima et al. ............... 369/44.26
5,495,460 * 2/1996 Haraguchi et al. ......... 369/124.02 X
5,974,007 * 10/1999 Getreuer ........................ 369/44.28 X

* cited by examiner

Primary Examiner—Paul W. Huber
(74) Attorney, Agent, or Firm—Sughrue, Mion, Zinn Macpeak & Seas, PLLC

(57) ABSTRACT

An information data recording/reproducing method correctly reproduces information data from a recording disc on which high density recording is performed through implementation of an increased linear density and a narrower track pitch. Each of recording data recorded at each of (m×n) recording points existing on n adjacent recording track (n is a natural number equal to or larger than two) including a target recording point and existing on m adjacent disc radial lines (m is a natural number equal to or larger than two) including the target recording point is subtracted from information data to derive a subtraction result. A residual operation is performed on the subtraction result to derive a residue value which is recorded at the target recording point. Recorded information is simultaneously read from (m×n) recording points existing on n adjacent recording tracks and existing on m adjacent disc radial lines to produce a read signal. The information data recorded at one recording point is recovered on the basis of the read signal to derive reproduced information data.

9 Claims, 16 Drawing Sheets

FIG.5

| a(j,k) | b(j-1,k-1) | b(j-1,k) | b(j,k-1) | b(j,k) | c(j,k) | d(j,k) |
|---|---|---|---|---|---|---|
| 0 | 0 | 0 | 0 | 0 | 0 | 0 |
| 0 | 0 | 0 | 1 | 1 | 2 | 0 |
| 0 | 0 | 1 | 0 | 1 | 2 | 0 |
| 0 | 0 | 1 | 1 | 0 | 2 | 0 |
| 0 | 1 | 0 | 0 | 1 | 2 | 0 |
| 0 | 1 | 0 | 1 | 0 | 2 | 0 |
| 0 | 1 | 1 | 0 | 0 | 2 | 0 |
| 0 | 1 | 1 | 1 | 1 | 4 | 0 |
| 1 | 0 | 0 | 0 | 1 | 1 | 1 |
| 1 | 0 | 0 | 1 | 0 | 1 | 1 |
| 1 | 0 | 1 | 0 | 0 | 1 | 1 |
| 1 | 0 | 1 | 1 | 1 | 3 | 1 |
| 1 | 1 | 0 | 0 | 0 | 1 | 1 |
| 1 | 1 | 0 | 1 | 1 | 3 | 1 |
| 1 | 1 | 1 | 0 | 1 | 3 | 1 |
| 1 | 1 | 1 | 1 | 0 | 3 | 1 |

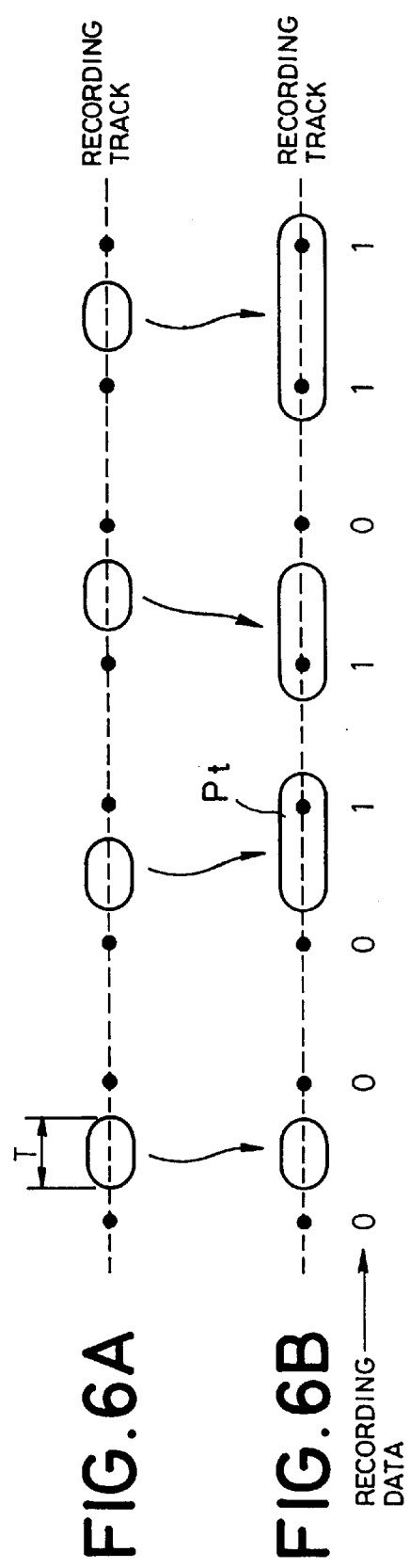

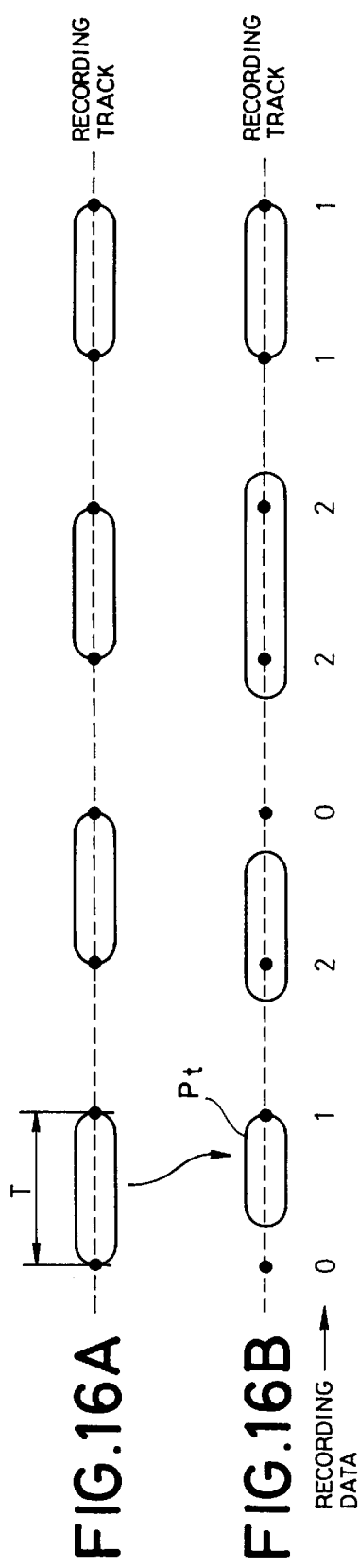

FIG.17

| a(j,k) | b(j-1,k-1) | b(j-1,k) | b(j,k-1) | b(j,k) | c(j,k) | d(j,k) |
|---|---|---|---|---|---|---|
| 0 | 0 | 0 | 0 | 0 | 0 | 0 |
| 0 | 0 | 0 | 0 | 1 | 2 | 3 | 0 |
| 0 | 0 | 0 | 0 | 2 | 1 | 3 | 0 |
| 0 | 0 | 0 | 1 | 0 | 2 | 3 | 0 |
| 0 | 0 | 0 | 1 | 1 | 1 | 3 | 0 |
| 0 | 0 | 0 | 1 | 2 | 0 | 3 | 0 |
| 0 | 0 | 0 | 2 | 0 | 1 | 3 | 0 |
| 0 | 0 | 0 | 2 | 1 | 0 | 3 | 0 |
| 0 | 0 | 0 | 2 | 2 | 2 | 6 | 0 |
| 0 | 0 | 1 | 0 | 0 | 2 | 3 | 0 |
| 0 | 0 | 1 | 0 | 1 | 1 | 3 | 0 |
| 0 | 0 | 1 | 0 | 2 | 0 | 3 | 0 |
| 0 | 0 | 1 | 1 | 0 | 1 | 3 | 0 |
| 0 | 0 | 1 | 1 | 1 | 0 | 3 | 0 |
| 0 | 0 | 1 | 1 | 2 | 2 | 6 | 0 |
| 0 | 0 | 1 | 2 | 0 | 0 | 3 | 0 |
| 0 | 0 | 1 | 2 | 1 | 2 | 6 | 0 |
| 0 | 0 | 1 | 2 | 2 | 1 | 6 | 0 |
| 0 | 0 | 2 | 0 | 0 | 1 | 3 | 0 |
| 0 | 0 | 2 | 0 | 1 | 0 | 3 | 0 |
| 0 | 0 | 2 | 0 | 2 | 2 | 6 | 0 |
| 0 | 0 | 2 | 1 | 0 | 0 | 3 | 0 |
| 0 | 0 | 2 | 1 | 1 | 2 | 6 | 0 |
| 0 | 0 | 2 | 1 | 2 | 1 | 6 | 0 |
| 0 | 0 | 2 | 2 | 0 | 2 | 6 | 0 |
| 0 | 0 | 2 | 2 | 1 | 1 | 6 | 0 |
| 0 | 0 | 2 | 2 | 2 | 0 | 6 | 0 |
| 1 | 0 | 0 | 0 | 0 | 1 | 1 | 1 |
| 1 | 0 | 0 | 0 | 1 | 0 | 1 | 1 |
| 1 | 0 | 0 | 0 | 2 | 2 | 4 | 1 |
| 1 | 0 | 0 | 1 | 0 | 0 | 1 | 1 |
| 1 | 0 | 0 | 1 | 1 | 2 | 4 | 1 |
| 1 | 0 | 0 | 1 | 2 | 1 | 4 | 1 |
| 1 | 0 | 0 | 2 | 0 | 2 | 4 | 1 |
| 1 | 0 | 0 | 2 | 1 | 1 | 4 | 1 |
| 1 | 0 | 0 | 2 | 2 | 0 | 4 | 1 |
| 1 | 0 | 1 | 0 | 0 | 0 | 1 | 1 |
| 1 | 0 | 1 | 0 | 1 | 2 | 4 | 1 |
| 1 | 0 | 1 | 0 | 2 | 1 | 4 | 1 |
| 1 | 0 | 1 | 1 | 0 | 2 | 4 | 1 |
| 1 | 0 | 1 | 1 | 1 | 1 | 4 | 1 |
| 1 | 0 | 1 | 1 | 2 | 0 | 4 | 1 |
| 1 | 0 | 1 | 2 | 0 | 1 | 4 | 1 |
| 1 | 0 | 1 | 2 | 1 | 0 | 4 | 1 |
| 1 | 0 | 1 | 2 | 2 | 2 | 7 | 1 |
| 1 | 0 | 2 | 0 | 0 | 2 | 4 | 1 |
| 1 | 0 | 2 | 0 | 1 | 1 | 4 | 1 |
| 1 | 0 | 2 | 0 | 2 | 0 | 4 | 1 |
| 1 | 0 | 2 | 1 | 0 | 1 | 4 | 1 |
| 1 | 0 | 2 | 1 | 1 | 0 | 4 | 1 |

FIG.18

| a(j,k) | b(j-1,k-1) | b(j-1,k) | b(j,k-1) | b(j,k) | c(j,k) | d(j,k) |
|---|---|---|---|---|---|---|
| 1 | 2 | 1 | 2 | 2 | 7 | 1 |
| 1 | 2 | 2 | 0 | 0 | 4 | 1 |
| 1 | 2 | 2 | 1 | 2 | 7 | 1 |
| 1 | 2 | 2 | 2 | 1 | 7 | 1 |
| 2 | 0 | 0 | 0 | 2 | 2 | 2 |
| 2 | 0 | 0 | 1 | 1 | 2 | 2 |
| 2 | 0 | 0 | 2 | 0 | 2 | 2 |
| 2 | 0 | 1 | 0 | 1 | 2 | 2 |
| 2 | 0 | 1 | 1 | 0 | 2 | 2 |
| 2 | 0 | 1 | 2 | 2 | 5 | 2 |
| 2 | 0 | 2 | 0 | 0 | 2 | 2 |
| 2 | 0 | 2 | 1 | 2 | 5 | 2 |
| 2 | 0 | 2 | 2 | 1 | 5 | 2 |
| 2 | 1 | 0 | 0 | 1 | 2 | 2 |
| 2 | 1 | 0 | 1 | 0 | 2 | 2 |
| 2 | 1 | 0 | 2 | 2 | 5 | 2 |
| 2 | 1 | 1 | 0 | 0 | 2 | 2 |
| 2 | 1 | 1 | 1 | 2 | 5 | 2 |
| 2 | 1 | 1 | 2 | 1 | 5 | 2 |
| 2 | 1 | 2 | 0 | 2 | 5 | 2 |
| 2 | 1 | 2 | 1 | 1 | 5 | 2 |
| 2 | 1 | 2 | 2 | 0 | 5 | 2 |
| 2 | 2 | 0 | 0 | 0 | 2 | 2 |
| 2 | 2 | 0 | 1 | 2 | 5 | 2 |
| 2 | 2 | 0 | 2 | 1 | 5 | 2 |
| 2 | 2 | 1 | 0 | 2 | 5 | 2 |
| 2 | 2 | 1 | 1 | 1 | 5 | 2 |
| 2 | 2 | 1 | 2 | 0 | 5 | 2 |
| 2 | 2 | 2 | 0 | 1 | 5 | 2 |
| 2 | 2 | 2 | 1 | 0 | 5 | 2 |
| 2 | 2 | 2 | 2 | 2 | 8 | 2 |

FIG. 21

| a(j,k) | b(j-1,k-2) | b(j-1,k-1) | b(j-1,k) | b(j,k-2) | b(j,k-1) | b(j,k) | c(j,k) | d(j,k) |
|---|---|---|---|---|---|---|---|---|
| 0 | 0 | 0 | 0 | 0 | 0 | 0 | 0 | 0 |
| 0 | 0 | 0 | 0 | 0 | 0 | 1 | 2 | 0 |
| 0 | 0 | 0 | 0 | 0 | 1 | 0 | 2 | 0 |
| 0 | 0 | 0 | 0 | 1 | 0 | 1 | 4 | 0 |
| 0 | 0 | 0 | 0 | 1 | 1 | 1 | 2 | 0 |
| 0 | 0 | 0 | 1 | 0 | 0 | 1 | 4 | 0 |
| 0 | 0 | 0 | 1 | 0 | 1 | 1 | 2 | 0 |
| 0 | 0 | 0 | 1 | 1 | 0 | 0 | 4 | 0 |
| 0 | 0 | 0 | 1 | 1 | 1 | 0 | 2 | 0 |
| 0 | 0 | 1 | 0 | 0 | 0 | 0 | 4 | 0 |
| 0 | 0 | 1 | 0 | 0 | 1 | 0 | 2 | 0 |
| 0 | 0 | 1 | 0 | 1 | 0 | 1 | 4 | 0 |
| 0 | 0 | 1 | 0 | 1 | 1 | 1 | 6 | 0 |
| 0 | 0 | 1 | 1 | 0 | 0 | 1 | 4 | 0 |
| 0 | 0 | 1 | 1 | 0 | 1 | 1 | 6 | 0 |
| 0 | 0 | 1 | 1 | 1 | 0 | 0 | 4 | 0 |
| 0 | 0 | 1 | 1 | 1 | 1 | 0 | 6 | 0 |
| 0 | 1 | 0 | 0 | 0 | 0 | 1 | 2 | 0 |
| 0 | 1 | 0 | 0 | 0 | 1 | 1 | 4 | 0 |
| 0 | 1 | 0 | 0 | 1 | 0 | 0 | 2 | 0 |
| 0 | 1 | 0 | 0 | 1 | 1 | 0 | 4 | 0 |
| 0 | 1 | 0 | 1 | 0 | 0 | 0 | 2 | 0 |
| 0 | 1 | 0 | 1 | 0 | 1 | 0 | 4 | 0 |
| 0 | 1 | 0 | 1 | 1 | 1 | 1 | 4 | 0 |
| 0 | 1 | 0 | 1 | 1 | 1 | 1 | 6 | 0 |
| 0 | 1 | 1 | 0 | 0 | 0 | 1 | 4 | 0 |
| 0 | 1 | 1 | 0 | 0 | 1 | 1 | 6 | 0 |
| 0 | 1 | 1 | 0 | 1 | 0 | 0 | 4 | 0 |
| 0 | 1 | 1 | 0 | 1 | 1 | 0 | 6 | 0 |
| 0 | 1 | 1 | 1 | 0 | 0 | 0 | 4 | 0 |
| 0 | 1 | 1 | 1 | 0 | 1 | 0 | 6 | 0 |
| 0 | 1 | 1 | 1 | 1 | 0 | 1 | 6 | 0 |
| 0 | 1 | 1 | 1 | 1 | 1 | 1 | 8 | 0 |
| 1 | 0 | 0 | 0 | 0 | 0 | 1 | 1 | 1 |
| 1 | 0 | 0 | 0 | 0 | 1 | 1 | 3 | 1 |
| 1 | 0 | 0 | 0 | 0 | 1 | 0 | 1 | 1 |
| 1 | 0 | 0 | 0 | 1 | 1 | 0 | 3 | 1 |
| 1 | 0 | 0 | 1 | 0 | 0 | 0 | 1 | 1 |
| 1 | 0 | 0 | 1 | 0 | 1 | 0 | 3 | 1 |
| 1 | 0 | 0 | 1 | 1 | 0 | 1 | 3 | 1 |
| 1 | 0 | 0 | 1 | 1 | 1 | 1 | 5 | 1 |
| 1 | 0 | 1 | 0 | 0 | 0 | 1 | 3 | 1 |
| 1 | 0 | 1 | 0 | 0 | 1 | 1 | 5 | 1 |
| 1 | 0 | 1 | 0 | 1 | 0 | 0 | 3 | 1 |
| 1 | 0 | 1 | 0 | 1 | 1 | 0 | 5 | 1 |
| 1 | 0 | 1 | 1 | 0 | 0 | 0 | 3 | 1 |
| 1 | 0 | 1 | 1 | 0 | 1 | 0 | 5 | 1 |
| 1 | 0 | 1 | 1 | 1 | 0 | 1 | 5 | 1 |
| 1 | 0 | 1 | 1 | 1 | 1 | 1 | 7 | 1 |
| 1 | 1 | 0 | 0 | 0 | 0 | 0 | 1 | 1 |
| 1 | 1 | 0 | 0 | 0 | 1 | 0 | 3 | 1 |

FIG.22

| a(j,k) | b(j-1,k-2) | b(j-1,k-1) | b(j-1,k) | b(j,k-2) | b(j,k-1) | b(j,k) | c(j,k) | d(j,k) |
|---|---|---|---|---|---|---|---|---|
| 1 | 1 | 0 | 0 | 1 | 0 | 1 | 3 | 1 |
| 1 | 1 | 0 | 0 | 1 | 1 | 1 | 5 | 1 |
| 1 | 1 | 0 | 1 | 0 | 0 | 1 | 3 | 1 |
| 1 | 1 | 0 | 1 | 0 | 1 | 1 | 5 | 1 |
| 1 | 1 | 0 | 1 | 1 | 0 | 0 | 3 | 1 |
| 1 | 1 | 0 | 1 | 1 | 1 | 0 | 5 | 1 |
| 1 | 1 | 1 | 0 | 0 | 0 | 0 | 3 | 1 |
| 1 | 1 | 1 | 0 | 0 | 1 | 0 | 5 | 1 |
| 1 | 1 | 1 | 0 | 1 | 0 | 1 | 5 | 1 |
| 1 | 1 | 1 | 0 | 1 | 1 | 1 | 7 | 1 |
| 1 | 1 | 1 | 1 | 0 | 0 | 1 | 5 | 1 |
| 1 | 1 | 1 | 1 | 0 | 1 | 1 | 7 | 1 |
| 1 | 1 | 1 | 1 | 1 | 0 | 0 | 5 | 1 |
| 1 | 1 | 1 | 1 | 1 | 1 | 0 | 7 | 1 |

INFORMATION DATA RECORDING/REPRODUCING METHOD

BACKGROUND OF THE INVENTION

1. Field of the Invention

The present invention relates to information data recording and/or reproducing methods for recording information data on a recording medium and reproducing such information data.

2. Description of Related Art

A partial response scheme is widely known as a scheme for recording and reproducing information data on and from a recording medium such as an optical disc, a magnetic disc, or the like.

FIG. 1 illustrates a recording/reproducing system which employs a PR(1,1) scheme, one of partial response schemes.

First in a recording system, a precoder 10 performs a predetermined logical operation on information data a(k) supplied from an information source, not shown, to convert the information data a(k) into recording data b(k) for recording which is supplied to a recording head 20.

The precoder 10, which consists of, for example, a subtractor 11, a mod2 processor 12, and a delay element 13, converts the information data a(k) into the recording data b(k) by the following logical operation:

$$b(k)=\{a(k)-b(k-1)\}\bmod 2 \qquad (1)$$

where a(k): information data at time k;

b(k): recording data at time k; and b(k-1) : recording data at the previous time (k-1).

"mod" in the above equation is an operator representing a residual operation.

For example, $$A \bmod B \qquad (2)$$

represents a residue produced by dividing "A" by "B," and the residue is output as its operation result. In this operation, it is assumed that the operation result has the same polarity as that of "B." In other words, the recording data b(k) is a residue produced by dividing {a(k)−b(k-1)} by two.

The recording head 20 irradiates recording laser light corresponding to the recording data b(k) onto a recording surface of a recording disc 30 which is driven to rotate at a predetermined velocity.

Assume herein that a so-called pit position recording is performed, where data is recorded as the presence or absence of a pit at each recording point.

For example, the recording head 20 irradiates recording laser light to the position of a recording point when the recording data b(k) is at logical level "1," and does not irradiate the recording laser light at the position of this recording point when the recording data b(k) is at logical level "0." In this case, pits Pt are formed only at the positions of recording points which were irradiated with the recording laser light, as illustrated in FIG. 2.

A reproducing head 40 in a reproducing system irradiates reproducing laser light onto a recording surface while tracing a recording track, and photo-electrically converts the reflected light from the recording surface to produce a read signal corresponding to a sequence of pits which are formed on the recording track.

It should be noted that in the PR(1,1) scheme, two adjacent recording points simultaneously exist on the same track within a range of a reading beam spot SP formed on a recording surface by the irradiation of reproducing laser light, as illustrated in FIG. 2. Thus, a read signal is produced at a level corresponding to the total sum of reflected light from each of these two recording points, i.e., the sum of recording data at each of the two recording points.

Here, when two binary recording data "0" and "1" are simultaneously read, a ternary read signal "0," "1," "2" is produced.

A level determining circuit 50 determines which of these three values a reading signal corresponds to, and supplies determination data c(k) in accordance with the determination result to a mod2 processor 60.

For example, when the levels of a read signal corresponding to the three values "0," "1," "2" are distributed about 0V (Volt), 1V, 2V, respectively, the level determining circuit 50 compares the read signal with two threshold values at 0.5V and 1.5V, samples the comparison result, and determines the levels of the ternary data.

The resulting determination data c(k) is expressed by:

$$c(k)=b(k)+b(k-1) \qquad (3)$$

The mod2 processor 60 produces reproduced information data d(k) by performing the following residual operation on the determination data c(k):

$$d(k)=c(k)\bmod 2 \qquad (4)$$

As described above, this recording/reproducing system enables the reproduction of information data corresponding to each recording point even though the interval between respective adjacent recording points on the same track is narrower than the diameter of the reading beam spot SP. In other words, it is possible to increase the linear density by narrowing the interval between recording points.

This recording/reproducing system, however, cannot increase the recording density in the radial direction of a disc, i.e., cannot reduce the track pitch, so that the entire recording capacity of a disc cannot be increased so much.

In addition, since the foregoing PR(1,1) scheme produces a read signal at ternary levels, the level determining circuit 50 cannot correctly determine the level of the read signal if the read signal has a low S/N ratio.

OBJECTS AND SUMMARY OF THE INVENTION

The present invention has been made to solve the problem mentioned above, and its object is to provide information data recording and/or reproducing methods which are capable of correctly reproducing information data from a recording disc on which information data is recorded at a high density both through implementation of an increased linear density and a narrower track pitch.

An information data recording method according to a first feature of the present invention is provided for recording an M-value information data at recording points interspersed on recording tracks of a recording disc, wherein (m×n) recording points exist on n adjacent recording tracks (n is a natural number equal to or larger than two) including a target recording point and exist on m adjacent disc radial lines (m is a natural number equal to or larger than two) including the target recording point, and the method comprises the steps of subtracting each of recording data recorded at each of (m×n−1) recording points other than the target recording point from the information data, within the (m×n) recording points, to produce a subtraction result, performing a residual operation on the subtraction result with the value of M to derive a residue value, and recording the residue value as recording data to be recorded at the target recording point.

An information data recording method according to a second feature of the present invention is provided for recording binary information data at recording points interspersed on recording tracks of a recording disc, and comprises the steps of calculating a recording data b(j, k) to be recorded at a target recording point existing on a recording track j and existing on a disc radial line k from information data a(j, k) corresponding to the target recording point, recording data b(j, k-1) recorded at a recording point existing on a disc radial line (k-1) adjacent to the disc radial line k on the recording track j, recording data b(j-1, k) recorded at a recording point existing on the disc radial line k on a recording track (j-1) adjacent to the recording track j, and recording data b(j-1, k-1) recorded at a recording point existing on the disc radial line (k-1) on the recording track (j-1), with the following logical equation:

$$b(j, k) = \{a(j, k) - b(j, k-1) - b(j-1, k) - b(j-1, k-1)\} \bmod 2 \quad (5)$$

where mod represents a residual operation, and recording the recording data b(j, k) at the target recording point.

An information data reproducing method according to a first feature of the present invention is provided for reproducing recorded information data from a recording disc on which M-value information data is recorded at each of a plurality of recording points interspersed on recording tracks, and comprises the steps of simultaneously reading recorded information from (m×n) recording points existing on n adjacent recording tracks (n is a natural number equal to or larger than two) and existing on m disc radial lines (m is a natural number equal to or larger than two) to produce a read signal, and recovering the information data recorded at one recording point within the (m×n) recording point, based on the read signal, to derive reproduced information data.

An information data reproducing method according to a second feature of the present invention is provided for reproducing recorded information from a recording disc on which binary information data is recorded at each of a plurality of recording points interspersed on recording tracks, and comprises the steps of producing a read signal by simultaneously reading recording data b(j, k) recorded at a recording point existing on a disc radial line k on a recording track j, recording data b(j, k-1) recorded at a recording point existing on a disc radial line (k-1) adjacent to the disc radial line k on the recording track j, recording data b(j-1, k) recorded at recording point existing on the disc radial line k on a recording track (j-1) adjacent to the recording track j, and recording data b(j-1, k-1) recorded at a recording point existing on the disc radial line (k-1) on the recording track (j-1), determining whether the read signal is 0, 1, 2, 3, or 4 within five-value data to produce a determination result, performing a residual operation on the determination result with two to derive a residue value, and outputting the residue value as reproduced information data.

An information data reproducing method according to a third feature of the present invention is provided for reproducing recorded information from a recording disc on which M-value information data is recorded at each of a plurality of recording points interspersed on recording tracks, and comprises the steps of simultaneously reading recorded information from (m×n) recording points existing on n adjacent recording tracks (n is a natural number equal to or larger than two) and existing on m adjacent disc radial lines (m is a natural number equal to or larger than two) to produce a read signal, performing Viterbi decoding on the read signal to recover the information data recorded at one of the (m×n) recording points, and outputting the information data as reproduced information data.

An information data recording/reproducing method according to a first feature of the present invention is provided for recording M-value information data at recording points interspersed on recording tracks of a recording disc, and reproducing the information data, wherein (m×n) recording points exist on n adjacent recording tracks (n is a natural number equal to or larger than two) including a target recording point and exist on m adjacent disc radial lines (m is a natural number equal to or larger than two) including the target recording point, and the method, when recording information data on the recording disc, comprises the steps of subtracting each of recording data recorded at each of (m×n-1) recording points other than the target recording point, within the (m×n) recording points, from the information data to derive a subtraction result, performing a residual operation on the subtraction result with the value of M to derive a residue value, and recording the residue value at the target recording point, while the method, when reproducing information data from the recording disc, comprises the steps of simultaneously reading recorded information from (m×n) recording points existing on n adjacent recording tracks (n is a natural number equal to or larger than two) and existing on m adjacent disc radial lines (m is a natural number equal to or larger than two) to produce a read signal, performing Viterbi decoding on the read signal to recover the information data recorded at one recording point within the (m×n) recording points, and outputting the recovered information data as reproduced information data.

An information data recording/reproducing method according to a second feature of the present invention is provided for recording binary information data at recording points interspersed on recording tracks on a recording disc, and reproducing the binary information data, wherein the method, when recording information data on the recording disc, comprises the steps of calculating a recording data b(j, k) to be recorded at a target recording point existing on a recording track j and existing on a disc radial line k from information data a(j, k) corresponding to the target recording point, recording data b(j, k-1) recorded at a recording point existing on a disc radial line (k-1) adjacent to the disc radial line k on the recording track j, recording data b(j-1, k) recorded at a recording point existing on the disc radial line k on a recording track (j-1) adjacent to the recording track j, and recording data b(j-1, k-1) recorded at a recording point existing on the disc radial line (k-1) on the recording track (j-1), with the following logical equation:

$$b(j, k) = \{a(j, k) - b(j, k-1) - b(j-1, k) - b(j-1, k-1)\} \bmod 2 \quad (6)$$

where mod represents a residual operation, and recording the recording data b(j, k) at the target recording point, while the method, when reproducing information data from the recording disc, comprises the steps of simultaneously reading the recording data b(j, k), the recording data b(j, k-1), the recording data b(j-1, k) and the recording data b(j-1, k-1) to produce a read signal, performing Viterbi decoding on the read signal to recover the information data a(j, k), and outputting the recovered information data as reproduced information data.

BRIEF DESCRIPTION OF THE DRAWINGS

FIG. 5 is a table showing a correspondence relationship between each of recording data b(j, k), determination data c(j, k) and reproduced information data d(j, k) produced by the recording/reproducing system illustrated in FIG. 2, and information data a(j, k);

FIGS. 6A and 6B respectively show an example of a sequence of pits formed on a recording track by pit edge recording in accordance with a SCIPER scheme;

FIGS. 16A and 16B respectively show an example of a sequence of pits formed on a recording track corresponding to ternary recording data by pit edge recording in accordance with the SCIPER scheme;

FIG. 17 is a table showing a correspondence relationship between each of recording data b(j, k), determination data c(j, k) and reproduced information data d(j, k) produced by the recording/reproducing system illustrated in FIG. 14, and information data a(j, k);

FIG. 18 is a table showing a correspondence relationship between each of recording data b(j, k), determination data c(j, k) and reproduced information data d(j, k) produced by the recording/reproducing system illustrated in FIG. 14, and information data a(j, k);

FIG. 21 is a table showing a correspondence relationship between each of recording data b(j, k), determination data c(j, k) and reproduced information data d(j, k) produced by the recording/reproducing system illustrated in FIG. 19, and information data a(j, k); and FIG. 22 is a table showing a correspondence relationship between each of recording data b(j, k), determination data c(j, k) and reproduced information data d(j, k) produced by the recording/reproducing system illustrated in FIG. 19, and information data a(j, k);

DETAILED DESCRIPTION OF THE PREFERRED EMBODIMENTS

Figure 4:
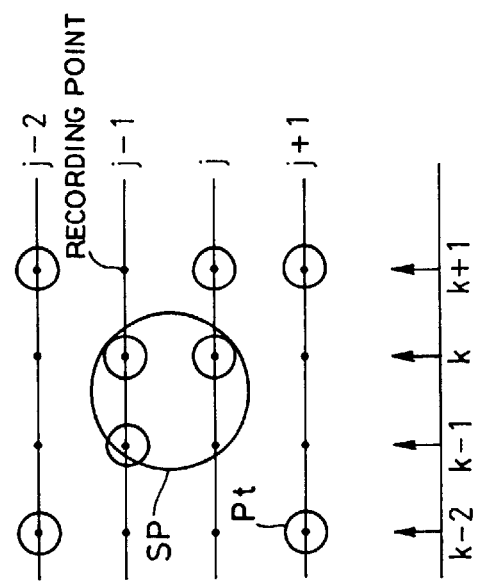
FIG. 4 is an enlarged view of a disc 30 illustrated in FIG. 3.
Figure 3:
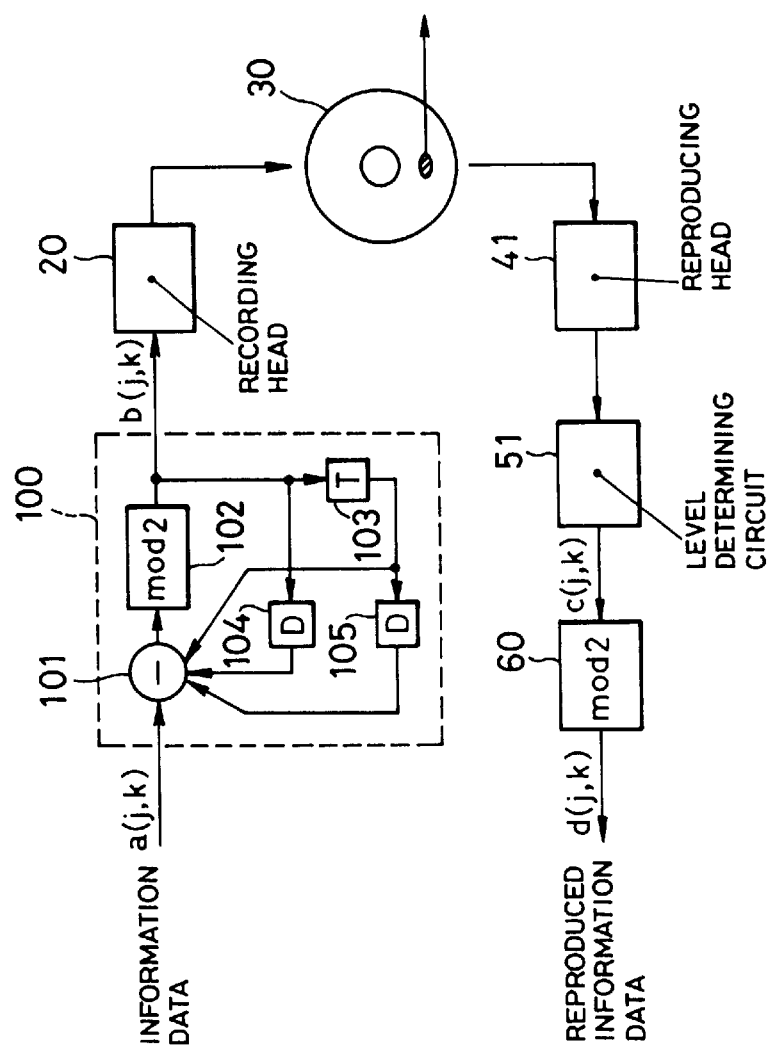
FIG. 3 is a block diagram illustrating an exemplary configuration of a recording/reproducing system based on an information data recording/reproducing method according to the present invention.

FIG. 3 illustrates in a block diagram form the configuration of a recording/reproducing system for recording and reproducing information data based on a recording/reproducing method according to the present invention. FIG. 4 is an enlarged view of a disc 30 illustrated in FIG. 3.

In this recording/reproducing system, recording points (indicated by black circles in FIG. 4) are aligned in a lattice form on a disc surface of a recording disc in a disc tangential direction and in a disc radial direction, and recording data is recorded at each of these recording points. Here, a CAV (constant angular velocity) scheme is employed to align recording points in the disc radial direction. In other words, recording data is recorded while the recording disc is rotated at a constant angular velocity.

A precoder 100 in a recording system in FIG. 3 performs a predetermined logical operation on information data a(j, k) supplied from an information source, not shown, to convert it into recording data b(j, k) for recording which is then supplied to a recording head 20.

As mentioned above, recording points are aligned in a lattice form on a disc surface of a recording disc in a disc tangential direction and in a disc radial direction. The coordinates (j, k) indicates positions of these recording points. More specifically, "j" indicates the position of a track on the disc, while "k" indicates the position of a disc radial line within a track.

The precoder 100 is composed of, for example, a subtractor 101, a mod2 processor 102, and delay elements 103–105. The delay element 103 may comprise, for example, a FIFO (first in first out) memory or the like for providing an input with a delay of a time corresponding to the number of recording data in one track, and outputting the delayed data. Each of the delay elements 104, 105 in turn provides an input with a delay of a time corresponding to one piece of recording data, and outputs the delayed data.

With the configuration described above, the precoder 100 performs the following logical operation on the information data a(j, k) to convert it into the recording data b(j, k):

$$b(j, k) = \{a(j, k) - b(j, k-1) - b(j-1, k) - b(j-1, k-1)\} \bmod 2 \quad (7)$$

where b(j, k): recording data to be recorded at a recording point which exists on a disc radial line k on a recording track j;

b(j, k-1): recording data recorded at a recording point which exists on a disc radial line (k-1) previous to the disc radial line k on the recording track j;

b(j-1, k): recording data recorded at a recording point which exists on the disc radial line k on a recording track (j-1) one track more internal to the recording track j; and b(j-1, k-1): recording data recorded at a recording point which exists on the disc radial line (k-1) previous to the disc radial line k on the recording track (j-1) one track more internal to the recording track j.

"mod" in the above equation is an operator representing a residual operation.

Stated another way, the recording data b(j, k) is a residue which is produced by dividing {a(j, k)−b(j, k-1)−b(j-1, k)−b(j-1, k-1)} by two.

As is apparent from the equation above, in the present invention, not only recording data recorded at the previous recording point but also recording data recorded at two respective recording points on an adjacent recording track are reflected to recording data to be recorded on a current track.

Turning back to FIG. 3, the recording head 20 irradiates recording laser light corresponding to the recording data b(j, k) onto a recording surface of the recording disc 30 as a recording medium.

Assume herein that data is recorded as the presence or absence of a pit at each recording point existing on each recording track of the recording disc 30, i.e., so-called pit position recording is performed.

The recording head 20, for example, irradiates recording laser light to a recording point, which exists on a disc radial line k on a recording track j, when the recording data b(j, k) is at logical level "1," and does not irradiate the recording laser light when the recording data b(j, k) is at logical level "0." In this event, a pit Pt is formed at the position of the recording point when it was irradiated with the recording laser light, while no pit Pt is formed at the position of the recording point which was not irradiated with the recording laser light. In this way, a sequence of pits Pt in accordance with the recording data b(j, k) is formed on the recording track of the recording disc 30.

A reproducing head 41 in a reproducing system traces an inter-track space between two mutually adjacent recording tracks on the recording disc 30 to irradiate reproducing laser light over the two recording tracks, and photoelectrically converts reflected light from the recording tracks to produce a read signal. With such irradiation of the reproducing laser light, a reading beam spot SP is irradiated to a total of four recording points existing on two disc radial lines on each of the two mutually adjacent recording tracks, and a read signal is produced in accordance with the reflected light at the respective recording points.

In this way, the reproducing head 41 simultaneously reads information from four recording points with the single reading beam spot SP. As a result, the read signal thus produced has a level corresponding to the sum of the recording data at the four recording points.

Here, when four binary recording data representing "0" or "1" are read simultaneously, a quinary (five-value) reading signal representing "0," "1," "2," "3" or "4" is produced.

The level determining circuit 51 determines which of the five values a read signal as mentioned above corresponds to, and supplies the mod2 processor 60 with determination data c(j, k) indicative of the determination result.

For example, when the levels of a read signal corresponding to five values "0," "1, " "2," "3" and "4" are distributed about 0V, 0.5V, 1.0V, 1.5V and 2V, respectively, the level determining circuit 51 compares the voltage of the read signal with each of four threshold values 0.25V, 0.75V, 1.25V and 1.75V and samples the comparison result to determine which of the five levels the read signal falls under.

The determination data c(j, k) thus produced is expressed by:

$$c(j, k)=b(j, k)+b(j, k\text{-}1)+b(j\text{-}1, k)+b(j\text{-}1, k\text{-}1) \tag{8}$$

The mod2 processor 60 performs a residual operation as follows on the determination data c(j, k) to produce reproduced information data d(j, k):

$$d(j, k)=c(j, k)\bmod 2 \tag{9}$$

FIG. 5 is a table showing a correspondence relationship between the information data a(j, k) and each of the recording data b(j, k), the determination data c(j, k) and the reproduced information data d(J, k) produced by the recording/reproducing system illustrated in FIG. 3.

As shown in FIG. 5, the information data a(j, k) before recording are coincident with the reproduced information data d(j, k) reproduced from the recording disc 30. It can be seen from this fact that information can be correctly reproduced even if a total of four recording points existing on two disc radial lines on each of two adjacent recording tracks are irradiated with a single reading beam spot.

Thus, according to this embodiment, information data can be correctly reproduced from a recording disc, even when an increased linear density and a narrower track pitch are introduced into the recording disc such that a total of four recording points existing on two mutually adjacent recording tracks are included within the area of a single reading beam spot.

While the foregoing embodiment has shown an example which employs the pit position recording, the present invention is not limited to this particular recording scheme, but may also be applied to pit edge recording.

As one of such pit edge recording schemes, a SCIPER (Single Carrier Independent Pit Edge Recording) scheme is known.

In the pit edge recording in accordance with the SCIPER scheme, pits Pt each having a predetermined fixed length T are arranged at predetermined intervals on a recording track, as illustrated in FIG. 6A. Then, each pit actually recorded or formed on the recording track has the positions of a leading edge and a trailing edge shifted by steps in accordance with the value of recording data, as illustrated in FIG. 6B.

FIG. 6B illustrates an example in which the length of the pit is maintained when recording data b(j, k) is "0," while a pit edge is shifted in a direction in which the length of the pit is extended when the recording data b(j, k) is "1," to record a sequence of recording data {0, 0, 0, 1, 1, 0, 1, 1} at respective recording points (indicated by black circles).

Figure 8:
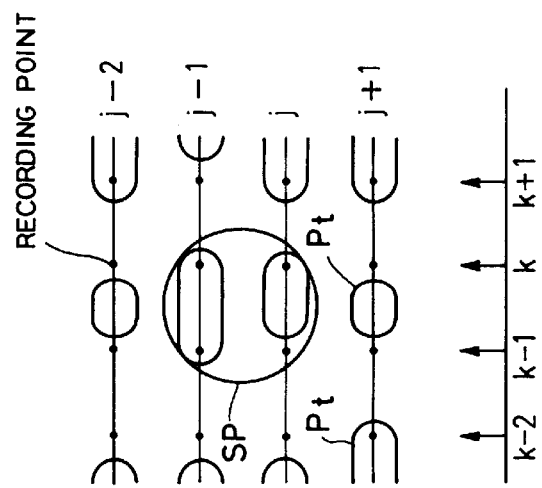
FIG. 8 is an enlarged view of a disc 30 illustrated in FIG. 7.
Figure 7:
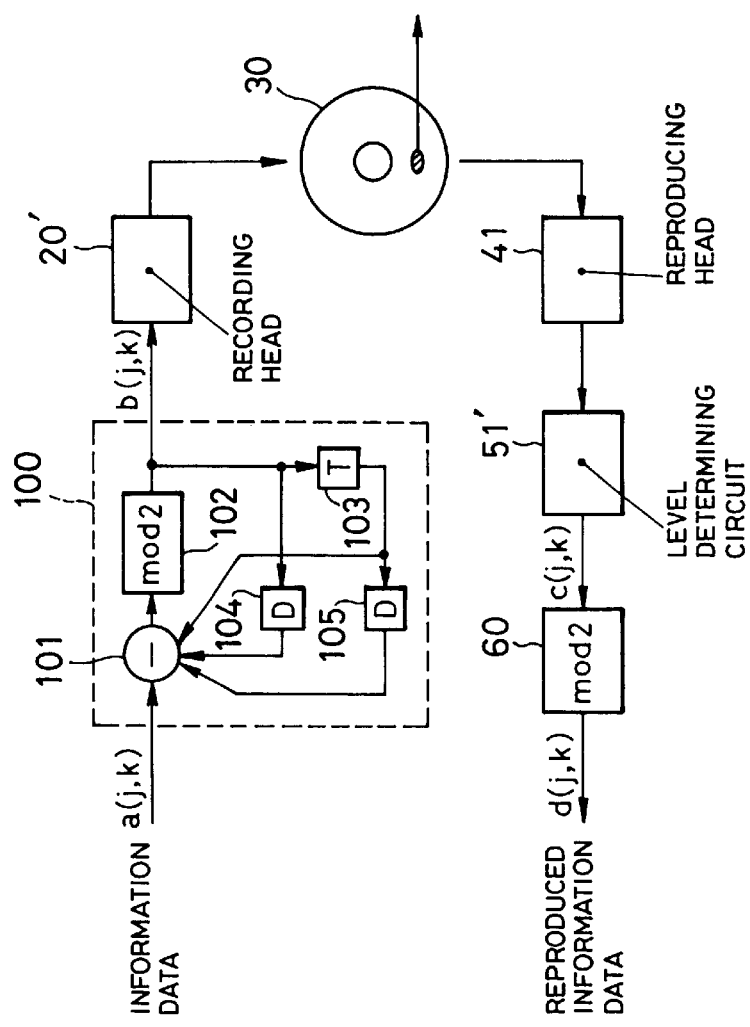
FIG. 7 is a block diagram illustrating the configuration of a recording/reproducing system which may be applied when information data is recorded/reproduced by pit edge recording in accordance with a SCIPER scheme.

FIG. 7 illustrates the configuration of a recording/reproducing system which may be applied when the pit edge recording scheme as described above is employed. FIG. 8 is an enlarged view of a disc 30 illustrated in FIG. 7.

The recording/reproducing system illustrated in FIG. 7 is adapted to record/reproduce information data in accordance with the CAV scheme in a manner similar to that illustrated in FIG. 3, and a precoder 100, a reproducing head 41 and a mod2, processor 60 have functions identical to their respective counterparts illustrated in FIG. 3.

First, the precoder 100 performs the following logical operation on information data a(j, k) to convert it into recording data b(j, k).

$$b(j, k)=(a(j, k)\text{-}b(j, k\text{-}1)\text{-}b(j\text{-}1, k)\text{-}b(j\text{-}1, k\text{-}1))\bmod 2 \tag{10}$$

A recording head 20' irradiates recording laser light corresponding to the recording data b(j, k) onto a recording surface of a recording disc 30 based on the SCIPER scheme. The irradiation of such recording laser light results in the formation of a sequence of pits on each recording track on the recording disc 30 in a form as illustrated in FIG. 6B.

The reproducing head 41 traces an inter-track space between two adjacent recording tracks formed on the recording disc 30 to irradiate reproducing laser light over the two recording tracks, and photoelectrically converts reflected light from the recording tracks to produce a read signal. With such irradiation of the reproducing laser light, a reading beam spot SP is irradiated to a total of four recording points on each of the two mutually adjacent recording tracks, and a read signal is produced in accordance with the reflected light at the respective recording points.

In this way, the reproducing head 41 reads information simultaneously from a total of four recording points existing on two mutually adjacent recording track with the single reading beam spot SP, and consequently produces a read signal at a level corresponding to the sum of the values of recording data at the four recording points.

In this event, since the irradiation of the reading beam spot SP alternately centers on two pits and on a land, where no pit is recorded, at every other clock, the entire level of the read signal also fluctuates upward and downward in alternation in accordance with the two types of the irradiation.

For example, when four of binary recording data are simultaneously read, a possible signal level taken as a read signal is one of 0.4 [V], 0.8 [V], 1.2 [V], 1.6 [V] and 2 [V] when the irradiation of the reading beam spot SP centers on pits, and one of 0 [V], 0.4 [V], 0.8 [V], 1.2 [V] and 1.6 [V] when the irradiation of the reading beam spot SP centers on a land.

Thus, a level determining circuit 51' determines the signal level of a read signal as one of 0.4 [V], 0.8 [V], 1.2 [V], 1.6 [V] and 2 [V] as mentioned above when the irradiation of the reading beam spot SP centers on pits, and determines the signal level of the read signal as one of 0 [V], 0.4 [V], 0.8 [V], 1.2 [V] and 1.6 [V] when the irradiation of the reading beam spot SP centers on a land.

The level determining circuit 51' supplies the mod2 processor 60 with determination data c(j, k) in accordance with the determination result as expressed by:

$$c(j, k)=b(j, k)+b(j, k-1)+b(j-1, k)+b(j-1, k-1) \quad (11)$$

The mod2 processor 60 performs the following residual operation on the determination data c(j, k) to produce reproduced information data d(j, k):

$$d(j, k)=c(j, k) \bmod 2 \quad (12)$$

In the embodiment described above, the level determining circuit 51' determines which of the five values or levels a read signal read by the reproducing head 41 falls under. However, if the read signal has a low S/N ratio, there is a fear that its level cannot be correctly determined.

To solve this problem, it is contemplated to implement determination employing Viterbi decoding adapted to the present invention to improve the reliability of reproduced information data.

Figure 10:
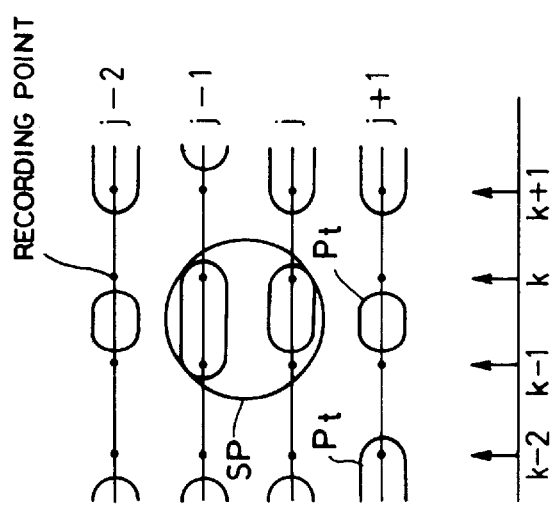
FIG. 10 is an enlarged view of a disc 30 illustrated in FIG. 9.
Figure 9:
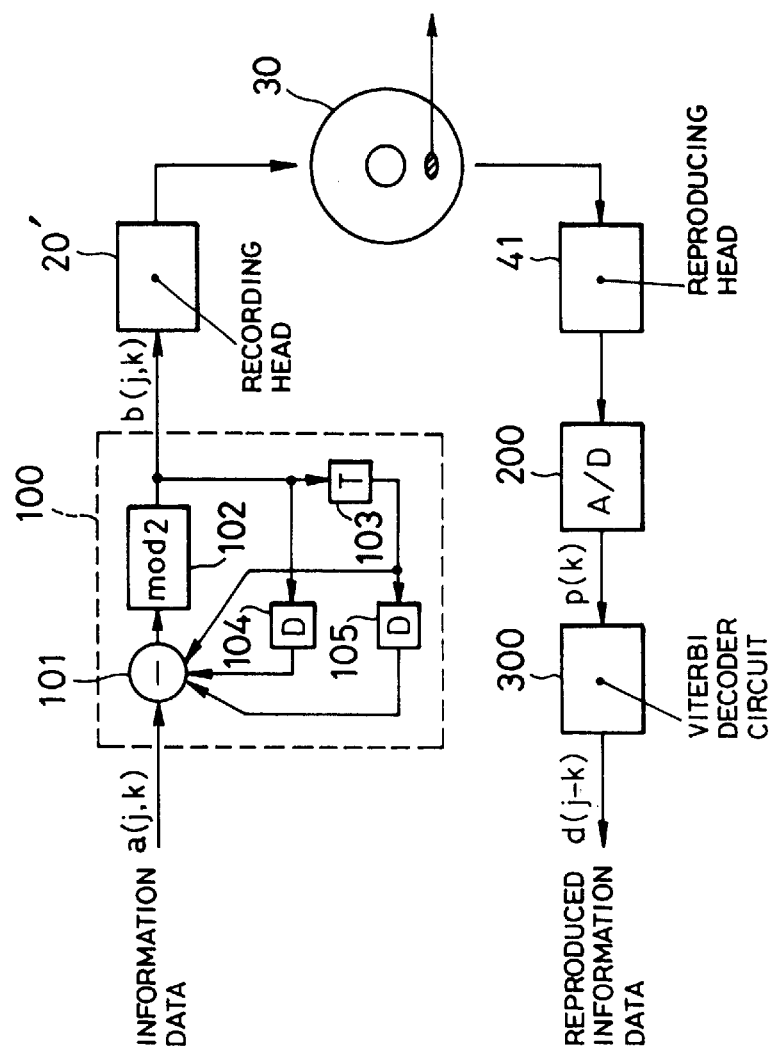
FIG. 9 is a block diagram illustrating an exemplary configuration of a recording/reproducing system based on an information recording/reproducing method according to the present invention.

FIG. 9 illustrates the configuration of a recording/reproducing system which may be applied when a Viterbi decoder circuit is employed in place of the level determining circuit 51' as information data determining means. FIG. 10 is an enlarged view of a disc 30 illustrated in FIG. 9.

In this recording/reproducing system, recording points are aligned in a lattice form on a disc surface of a recording disc in a disc tangential direction and in a disc radial direction, and recording data is recorded at each of these recording points. Here, a CAV (constant angular velocity) scheme is employed to align recording points in the disc radial direction. In other words, recording data is recorded while the recording disc is rotated at a constant angular velocity.

In FIG. 9, a precoder 100 in a recording system performs a predetermined logical operation on information data a(j, k) supplied from an information source, not shown, to convert it into recording data b(j, k) for recording which is then supplied to a recording head 20'.

As mentioned above, recording points are aligned in a lattice form on a disc surface of a recording disc in a disc tangential direction and in a disc radial direction. The coordinates (j, k) indicate positions of these recording points. More specifically, "j" indicates the position of a track on the disc, while "k" indicates the position of a disc radial line within a track.

The precoder 100 is composed of, for example, a subtractor 101, a mod2 processor 102, and delay elements 103–105. The delay element 103 may comprise, for example, a FIFO (first in first out) memory or the like for providing an input with a delay of a time corresponding to the number of recording data in one track, and outputting the delayed data. Each of the delay elements 104, 105 in turn provides an input with a delay of a time corresponding to one piece of recording data, and outputs the delayed data.

With the configuration described above, the precoder 100 performs the following logical operation on the information data a(j, k) to convert it into the recording data b(j, k):

$$b(j, k)=\{a(j, k)-b(j, k-1)-b(j-1, k)-b(j-1, k-1)\} \bmod 2 \quad (13)$$

where b(j, k): recording data to be recorded at a recording point which exists on a disc radial line k on a recording track j;

b(j, k-1): recording data recorded at a recording point which exists on a disc radial line (k-1) previous to the disc radial line k on the recording track j;

b(j-1, k): recording data recorded at a recording point which exists on the disc radial line k on a recording track (j-1) one track more internal to the recording track j; and b(j-1, k-1): recording data recorded at a recording point which exists on the disc radial line (k-1) previous to the disc radial line k on the recording track (j-1) one track more internal to the recording track j, "mod" in the above equation is an operator representing a residual operation.

Stated another way, the recording data b(j, k) is a residue which is produced by dividing {a(j, k)−b(j, k-1)−b(j-1, k)−b(j-1, k-1)} by two.

As is apparent from the equation above, in this embodiment, not only recording data recorded at the previous recording point but also recording data recorded at two respective recording points on an adjacent recording track are reflected to recording data to be recorded on a current track.

The recording head 20' irradiates recording laser light corresponding to the recording data b(j, k) onto a recording surface of the recording disc 30 as a recording medium.

The recording head 20' irradiates recording laser light corresponding to the recording data b(j, k) on the recording surface of the recording disc 30 by the pit edge recording in accordance with the SCIPER scheme as previously illustrated in FIGS. 6A, 6B. Such irradiation of the recording laser light results in the formation of a sequence of pits on each recording track on the recording disc 30 in a form as illustrated in the aforementioned FIG. 6B.

The reproducing head 41 traces an inter-track space between two adjacent recording tracks formed on the recording disc 30 to irradiate reproducing laser light over the two recording tracks, and photoelectrically converts reflected light from the recording tracks to produce a read signal. With such irradiation of the reproducing laser light, a reading beam spot SP is irradiated to a total of four recording points on the two respective recording tracks mutually adjacent thereto, and a read signal is produced in accordance with the reflected light at the respective recording points.

In this way, the reproducing head 41 reads information simultaneously from a total of four recording points existing on mutually adjacent two recording tracks with the single reading beam spot SP, and consequently produces a read signal at a level corresponding to the sum of the values of recording data at the four recording points.

An A/D converter 200 samples the read signal to produce a read sample value p(k) which is supplied to the Viterbi decoder circuit 300.

The Viterbi decoder circuit 300 performs Viterbi decoding based on the read sample value p(k) to produce decoded data which is output as reproduced information data d(j, k).

While the conventional Viterbi decoding defines the state of a recording/reproducing system using only recording data on a currently reproduced track, the Viterbi decoding according to the present invention defines the state of a recording/reproducing system additionally using recording data on adjacent tracks. Here, the state is defined on the basis of recording data b(j, k) and b(j-1, k) which correspond to respective recording points existing on a disc radial line on two mutually adjacent recording tracks. While there are four possible combinations of the two recording data "00," "01," "10," "11," "01" and "10" cannot be distinguished from each other at the level of the read signal, so that they are regarded as collectively representing a single state. In addition, "00" is defined as State S0; "01" and "10" as State S1; and "11" as State S2.

Figure 11:
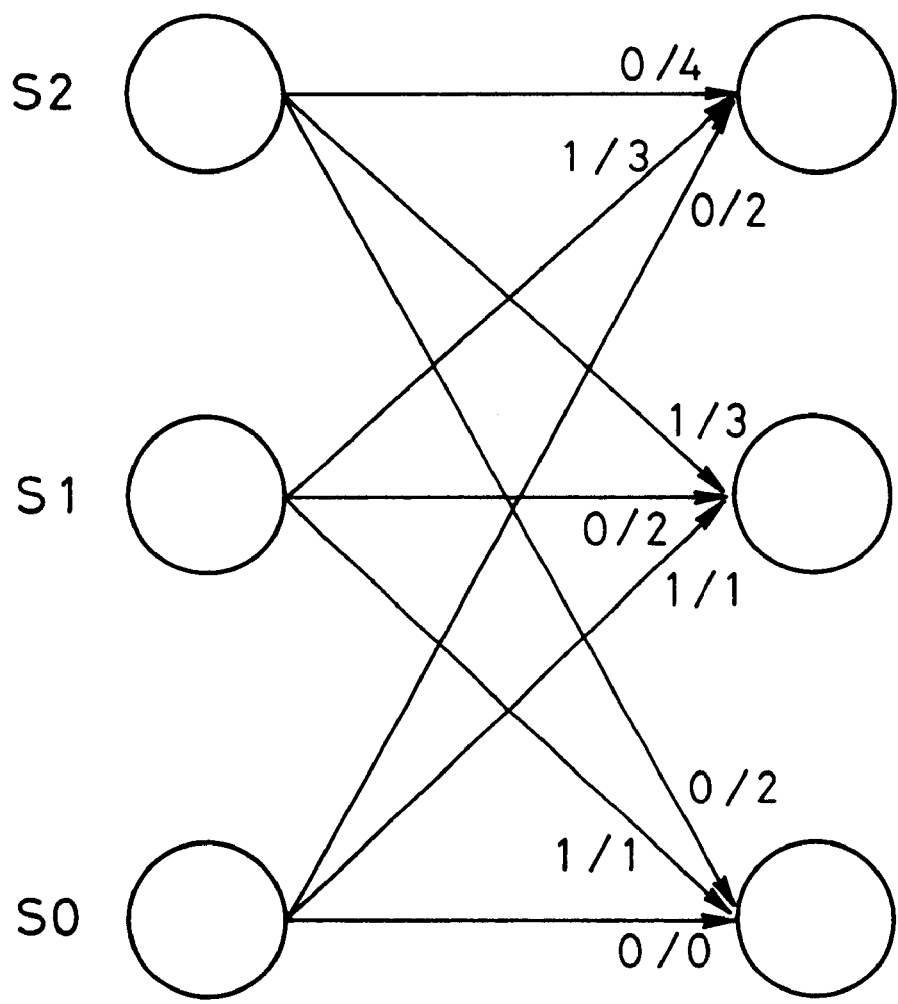
FIG. 11 is a trellis diagram for a Viterbi decoder circuit 300.

FIG. 11 is a trellis diagram for the Viterbi decoding which illustrates state transitions among the states defined above.

As illustrated in FIG. 11, there are nine possible transitions from State S0–S2 to the next State S0–S2, where each state transition corresponds to information data a(j, k) as an input to the recording/reproducing system and determination data c(j, k) as an output therefrom.

The correspondence between these input and output and the state transition conforms to the aforementioned equations:

$$b(j, k) = \{a(j, k) - b(j, k-1) - b(j-1, k) - b(j-1, k-1)\} \mod 2 \quad (14)$$

and $$c(j, k) = b(j, k) + b(j, k-1) + b(j-1, k) + b(j-1, k-1) \quad (15)$$

or the relationship indicated by the table of FIG. 5.

In the Viterbi decoding, one state transition is called a branch, and a plurality of consecutive state transitions are called a path. The algorithm of the Viterbi decoding calculates a branchmetric representative of a branch existing probability and a pathmetric representative of a path existing probability, selects a decoding path which minimizes the pathmetric, and outputs data corresponding to respective branches in the decoding path as decoded data.

In the following, description will be made on the operation of the Viterbi decoder circuit 300 for performing a decoding operation based on a decoding algorithm derived from the trellis diagram of FIG. 11.

Figure 12:
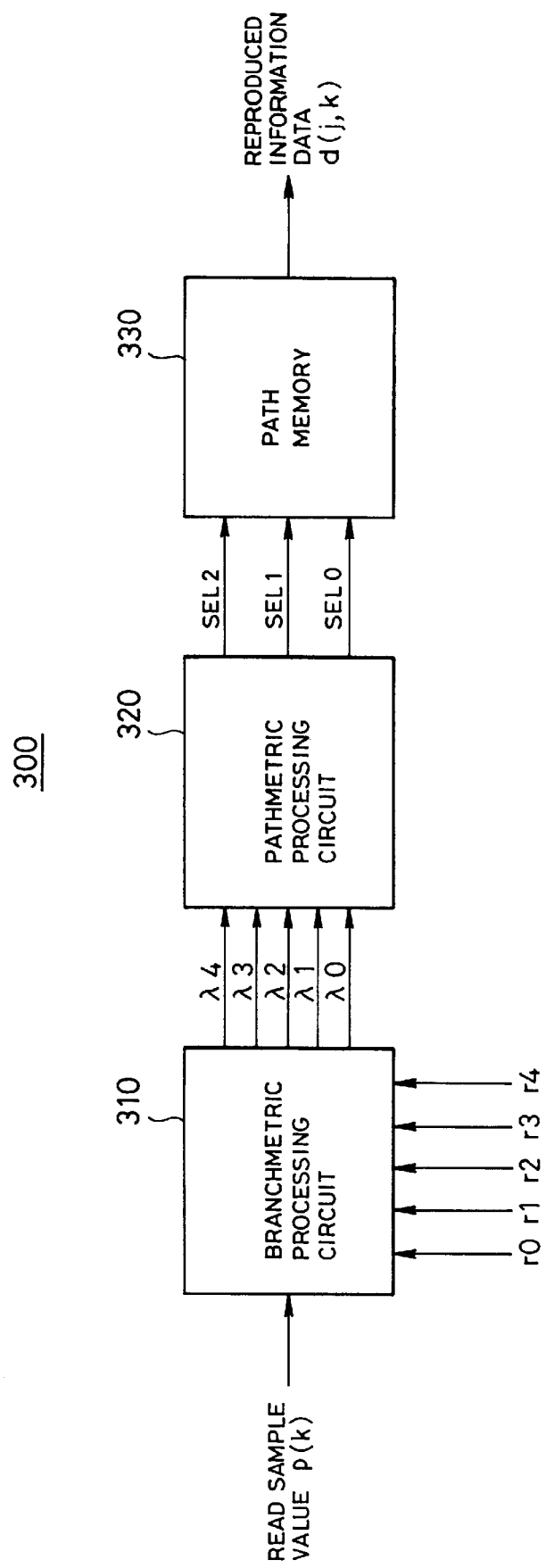
FIG. 12 is a functional block diagram illustrating the internal configuration of the Viterbi decoder circuit 300.

FIG. 12 generally illustrates the internal configuration of the Viterbi decoder circuit 300 as mentioned above.

Referring specifically to FIG. 12, a read sample value p(k) from the A/D converter 200 is supplied to a branchmetric processing circuit 310 at every clock.

The following description will proceed on the assumption that levels of read sample values generated by A/D converting a read signal read by the reproducing head 41 are distributed about r0, r1, r2, r3 and r4, respectively.

The branchmetric processing circuit 310 performs the following calculations to derive five branchmetrics $\lambda 0$–$\lambda 4$, respectively, using each of these r0–r4 as predicted values:

$$\lambda 0(k) = (p(k) - r0)^2$$
$$\lambda 1(k) = (p(k) - r1)^2$$
$$\lambda 2(k) = (p(k) - r2)^2$$
$$\lambda 3(k) = (p(k) - r3)^2$$
$$\lambda 4(k) = (p(k) - r4)^2 \quad (16)$$

Thus, each of the branchmetrics $\lambda 0$–$\lambda 4$ is a square error between a read sample value p(k) and each of the predicted values r0–r4.

A pathmetric processing circuit 320 performs addition, comparison and selection on each of the branchmetrics $\lambda 0$–$\lambda 4$ supplied at every clock from the branchmetric processing circuit 310, and derives three pathmetrics L0(k), L1(k), L2(k).

That is, the pathmetric processing circuit 320 calculates the three pathmetrics as expressed by:

$$L0(k) = \min\{L0(k-1) + \lambda 0(k), L1(k-1) + \lambda 1(k), L2(k-1) + \lambda 2(k)\}$$
$$L1(k) = \min\{L0(k-1) + \lambda 1(k), L1(k-1) + \lambda 2(k), L2(k-1) + \lambda 3(k)\}$$
$$L2(k) = \min\{L0(k-1) + \lambda 2(k), L1(k-1) + \lambda 3(k), L2(k-1) + \lambda 4(k)\} \quad (17)$$

In the above equations, min(A, B, C) represents an operation for selecting the smallest value of A–C. The pathmetric processing circuit 320 also outputs the results of selecting the smallest values in the respective pathmetrics L0(k), L1(k), L2(k) as three path selecting signals SEL0, SEL1, SEL2. Each of the path selecting signal SEL0, SEL1, SEL2 is ternary data indicating which term presents the smallest value in the right side of each equation for calculating each of the pathmetrics L0(k), L1(k), L2(k), and is represented by two binary bit data in an actual circuit.

A path memory 300, which stores three data sequences, outputs reproduced information data d(j, k) while updating these data sequences in accordance with three path selecting signals SEL0, SEL1, SEL3 supplied thereto at every clock from the pathmetric processing circuit 320.

With the foregoing calculations, a sequence of decoded data which minimize the square error for a sequence of read sample values p(k) is derived as reproduced information data.

According to the Viterbi decoding described above, since information data is decoded by a decoding algorithm which considers not only pits on the same track but also pits on an adjacent track, it is possible to correctly reproduce information data even when the track density is increased by narrowing the track pitch.

Figure 13:
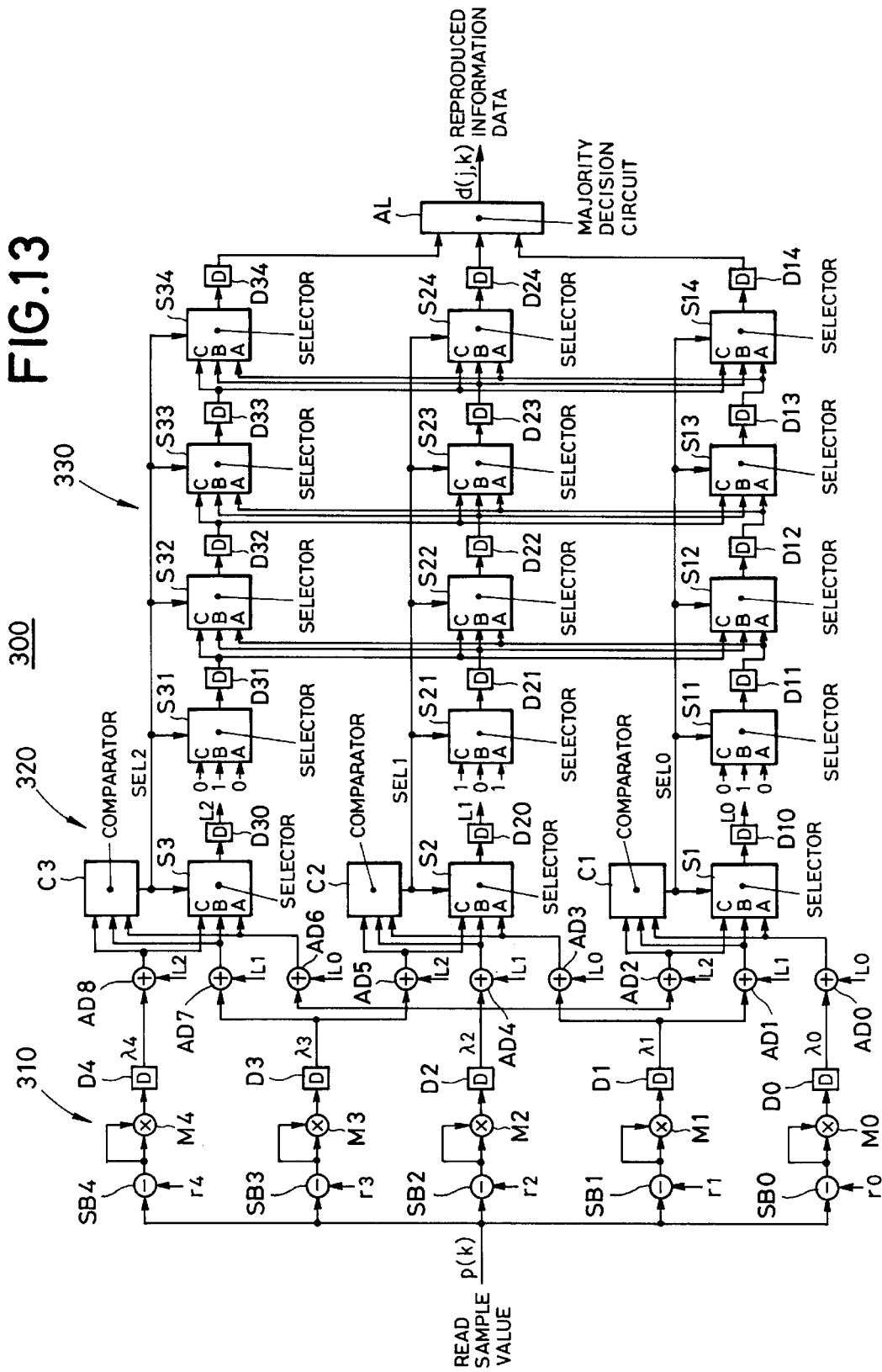
FIG. 13 is a circuit block diagram illustrating in greater detail the internal configuration of the Viterbi decoder circuit 300.

FIG. 13 illustrates a detailed internal configuration of the Viterbi decoder circuit 300 as described above.

Referring specifically to FIG. 13, the branchmetric processing circuit 310 comprises subtractors SB0–SB4, multipliers M0–M4, and D flip-flops D0–D4 for calculating a square error between a read sample value p(k) and each of the predicted values r0–r4 to produce each of the branchmetrics $\lambda 0$–$\lambda 4$.

In the pit edge recording scheme which provides the recording form as illustrated in FIG. 6B, since the irradiation of the reading beam spot SP of the reproducing laser light alternately centers on two pits and on a land, where no pit is recorded, at every other clock, the entire level of the read signal also fluctuates upward and downward in alternation in accordance with the irradiation of the reading beam spot SP. Therefore, the value of each of the predicted values r0–r4 is also increased and decreased alternately at every clock by a predetermined amount.

The pathmetric processing circuit 320, on the other hand, comprises adders AD0–AD8, comparators C1–C3, selector circuits S1–S3, and D flip-flops D10, D20, D30, all for performing accumulative addition, comparison and selection on each of the branchmetrics $\lambda 0$–$\lambda 4$ to calculate three pathmetrics L0(k), L1(k), L2(k).

The adder AD0 in the pathmetric processing circuit 320 adds the branchmetric $\lambda 0$ to the pathmetric L0 output from the D flip-flop D10, and supplies the addition result to each of the selector circuit S1 and the comparator C1. The adder AD1 adds the branchmetric $\lambda 1$ to the pathmetric L1 output from the D flip-flop D20, and supplies the addition result to each of the selector circuit Si and the comparator C1. The adder AD2 adds the branchmetric $\lambda 2$ to the pathmetric L2 output from the D flip-flop D30, and supplies the addition result to each of the selector circuit Si and the comparator C1.

The comparator C1 supplies the selector circuit S1 with a path selecting signal SEL0 which indicates the smallest addition result within the addition results supplied thereto from the respective adders AD0–AD2. The selector circuit S1 uniquely selects one of the addition results supplied from the respective adders AD0–AD2 indicated by the path selecting signal SEL0, and supplies the D flip-flop D10 with the selected addition result. The D flip-flop D10 delays the addition result supplied from the selector circuit S1, i.e., the smallest addition result of the addition results supplied from the respective adders AD0–AD2 by one clock period, and outputs the delayed addition result as the pathmetric L0.

The adder AD3 adds the branchmetric $\lambda 1$ to the pathmetric L0 output from the D flip-flop D10, and supplies the addition result to each of the selector circuit S2 and the comparator C2. The adder AD4 adds the branchmetric $\lambda 2$ to the pathmetric L1 output from the D flip-flop D20, and supplies the addition result to each of the selector circuit S2 and the comparator C2. The adder AD5 adds the branchmetric $\lambda 3$ to the pathmetric L2 output from the D flip-flop D30, and supplies the addition result to each of the selector circuit S2 and the comparator C2.

The comparator C2 supplies the selector circuit S2 with a path selecting signal SELL indicative of the smallest addition results of the addition results supplied from the respective adders AD3–AD5. The selector circuit S2 uniquely selects one of the addition results supplied from the respective adders AD3–AD5 indicated by the path selecting signal SEL1, and supplies the selected addition result to the D flip-flop D20. The D flip-flop D20 delays the addition result supplied from the selector circuit S2, i.e., the smallest addition result supplied from the respective adders AD3–AD5 by one clock period, and outputs the delayed addition result as the pathmetric L1.

The adder AD6 adds the branchmetric $\lambda 2$ to the pathmetric L0 output from the D flip-flop D10, and supplies the addition result to each of the selector circuit S3 and the comparator C3. The adder AD7 adds the branchmetric $\lambda 3$ to the pathmetric L1 output from the D flip-flop D20, and supplies the addition result to the selector circuit S3 and the comparator C3. The adder AD8 adds the branchmetric $\lambda 4$ to the pathmetric L2 output from the D flip-flop D30, and supplies the addition result to each of the selector circuit S3 and the comparator C3.

The comparator C3 supplies the selector circuit S2 with a path selecting signal SEL2 indicative of the smallest addition result of the addition results supplied from the respective adders AD6–AD8. The selector circuit S3 uniquely selects one of the addition results supplied from the respective adders AD6–AD8 indicated by the path selecting signal SEL2, and supplies the selected addition result to the D flip-flop D30. The D flip-flop D30 delays the addition result supplied from the selector circuit S3, i.e., the smallest addition result of the addition results supplied from the respective adders AD6–AD8, by one clock period, and outputs the delayed addition result as the pathmetric L2.

A path memory 330 comprises selector circuits S11–S14 and D flip-flops D11–D14 for deriving a first data sequence; selector circuits S21–S24 and D flip-flops D21–D24 for deriving a second data sequence; selector circuits S31–S34 and D flip-flops D31–D34 for deriving a third data sequence; and a majority decision circuit AL which takes the majority of the three data sequences and outputs the result as reproduced information data d(j, k).

Each of the selector circuits S11–S14 uniquely selects one of signals supplied respectively to its input terminals A–C indicated by the path selecting signal SEL0, and supplies the selected signal to the D flip-flop at the next stage. In other words, each of the selector circuits S11–S14 selects a signal supplied to the input terminal A when the addition result of the adder AD0 is the smallest of the addition results from the respective adders AD0–AD2; a signal supplied to the input terminal B when the addition result of the adder AD1 is the smallest; and a signal supplied to the input terminal C when the addition result of the adder AD2 is the smallest.

Each of the D flip-flops D11–D14 outputs an input signal with a delay of one clock period. With this operation, the first data sequence is sequentially output from the D flip-flop D14.

Each of the selector circuits S21–S24 uniquely selects one of signals supplied respectively to its input terminals A–C indicated by the path selecting signal SEL1, and supplies the selected signal to the D flip-flop at the next stage. In other words, each of the selector circuits S21–S24 selects a signal supplied to the input terminal A when the addition result of the adder AD3 is the smallest of the addition results from the respective adders AD3–AD5; a signal supplied to the input terminal B when the addition result of the adder AD4 is the smallest; and a signal supplied to the input terminal C when the addition result of the adder AD5 is the smallest. Each of the D flip-flops D21–D24 outputs an input signal with a delay of one clock period. With this operation, the second data sequence is sequentially output from the D flip-flop D24.

Each of the selector circuits S31–S34 uniquely selects one of signals supplied respectively to its input terminals A–C indicated by the path selecting signal SEL2, and supplies the selected signal to the D flip-flop at the next stage. In other words, each of the selector circuits S31–S34 selects a signal supplied to the input terminal A when the addition result of the adder AD6 is the smallest of the addition results from the respective adders AD6–AD8; a signal supplied to the input terminal B when the addition result of the adder AD7 is the smallest; and a signal supplied to the input terminal C when the addition result of the adder AD8 is the smallest. Each of the D flip-flops D31–D34 outputs an input signal with a delay of one clock period. With this operation, the third data sequence is sequentially output from the D flip-flop D34.

While in the embodiment illustrated in FIG. 13, the length of the path memory is chosen to be four bits, the actual path memory has a length of 10–100 bits.

Figure 1:
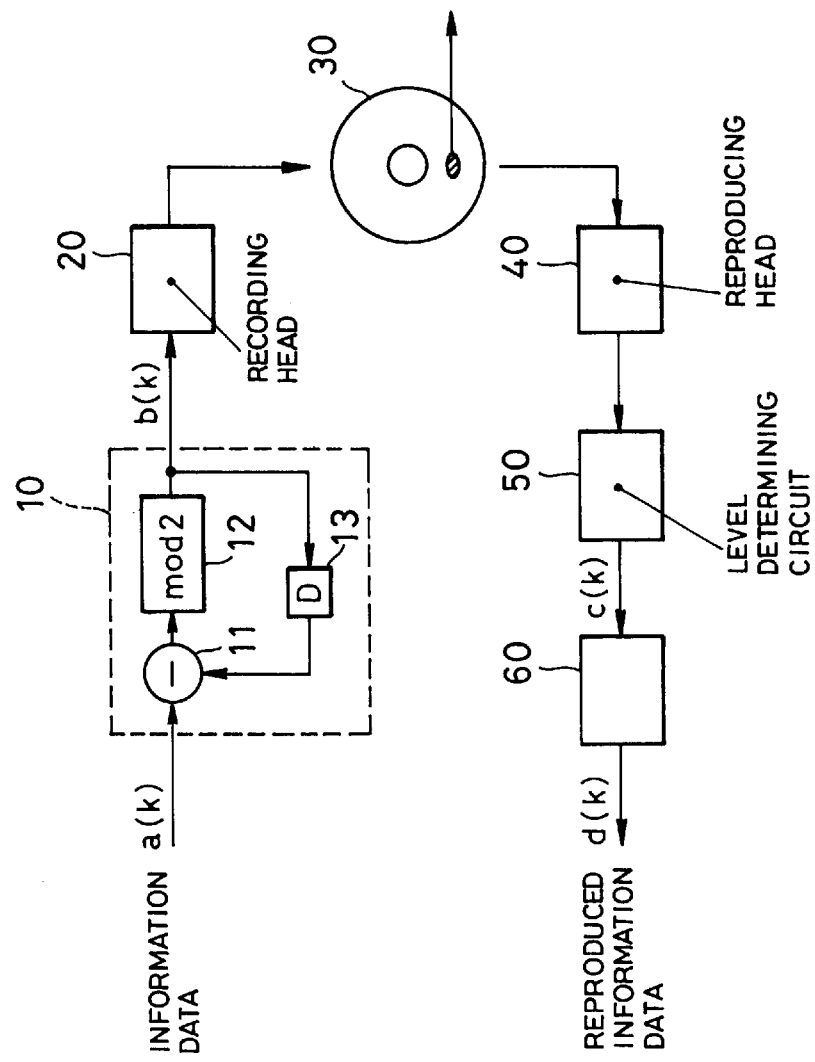
FIG. 1 is a block diagram illustrating the configuration of a conventional recording/reproducing system which employs a partial response scheme.
Figure 2:
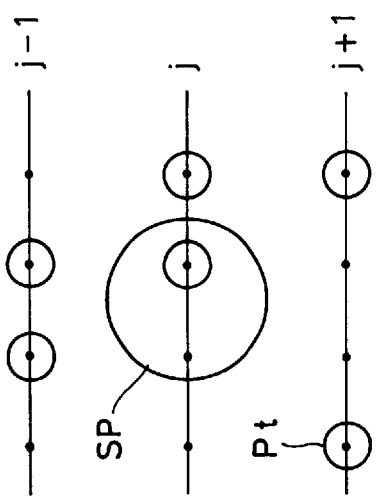
FIG. 2 is an enlarged view of a disc 30 illustrated in FIG. 1.

Also, while the embodiment illustrated in FIG. 9 employs the pit edge recording scheme for recording data, the present invention is not limited to this particular scheme. Alternatively, the Viterbi decoding can also be applied in a similar manner when the pit position scheme employed in the embodiment of the aforementioned FIG. 2 is used.

As described above, the Viterbi decoder circuit 300 illustrated in FIGS. 12 and 13 calculates five branchmetrics and three pathmetrics based on five predicted values, derives decoded data while updating three data sequences stored in the path memory in accordance with three path selecting signals, and outputs one selected by majority decision as reproduced information data.

Thus, according to the recording/reproducing system employing the Viterbi decoder circuit 300 in accordance with the present invention, information data can be highly reliably reproduced even when an increased linear density and a narrower track pitch are introduced into the recording disc such that a total of four recording points existing on two mutually adjacent recording tracks are included in a single reading beam spot.

In the embodiment as described above, the information data a(j, k), the recording data b(j, k), and the reproduced information data d(j, k) are binary data, while the determination data c(j, k) is a quinary data. The present invention, however, is not limited to these particular data structures.

For example, the present invention may also be applied when the information data a(j, k), the recording data b(j, k), and the reproduced information data d(j, k) are ternary data having a value "0," "1" or "2," and the determination data c(j, k) is a nine-value data which may take a value in a range of "0" to "8."

Figure 15:
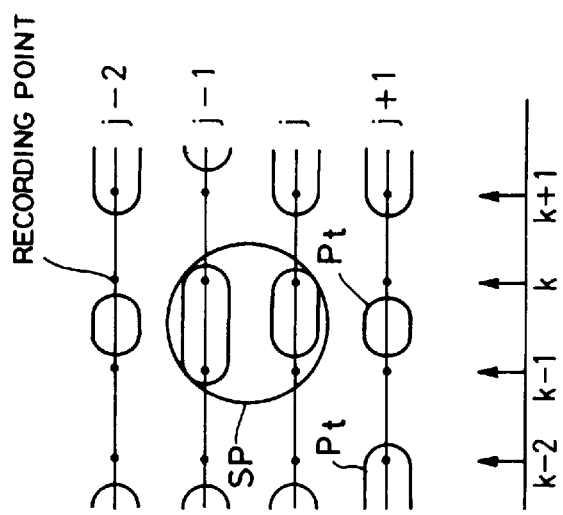
FIG. 15 is an enlarged view of a disc 30 illustrated in FIG. 14.
Figure 14:
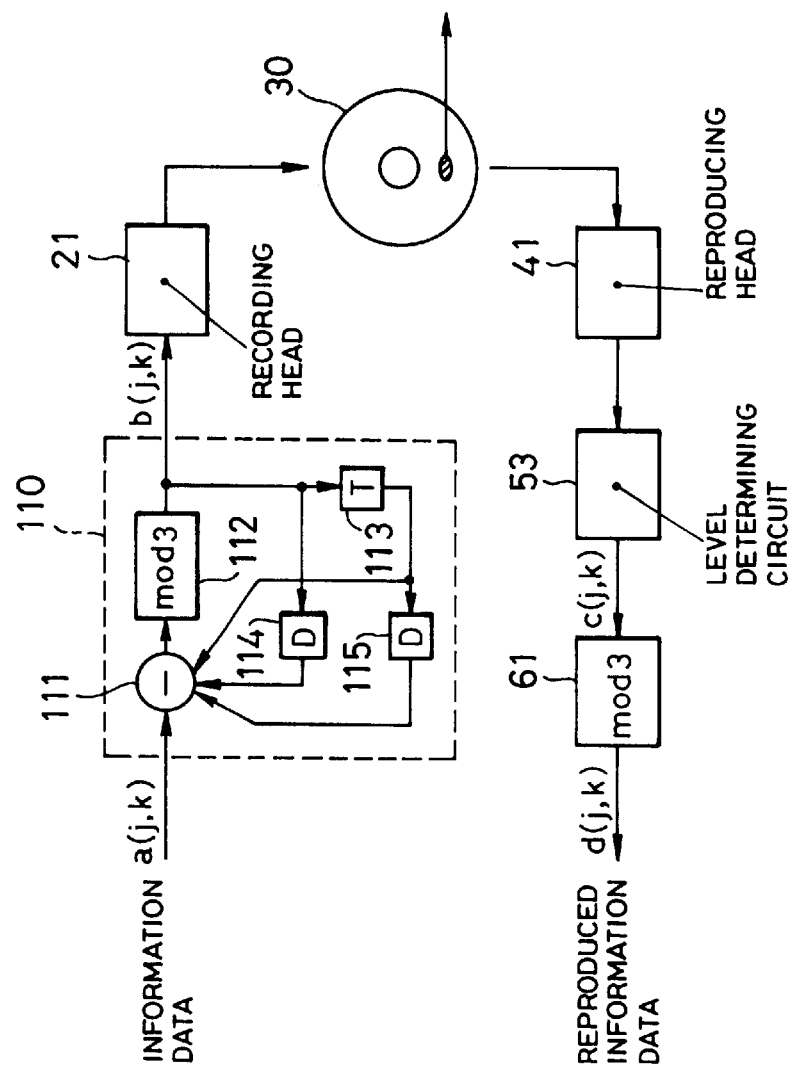
FIG. 14 is a block diagram illustrating the configuration of a recording/reproducing system which is applied to recording/reproducing ternary information data.

FIG. 14 illustrates the configuration of a recording/reproducing system which has been made in view of the modification mentioned above. FIG. 15 is an enlarged view of a disc 30 illustrated in FIG. 14.

A precoder 110 in FIG. 14 performs a predetermined logical operation on ternary information data a(j, k) supplied from an information source, not shown, to convert it into recording data b(j, k) for recording, and supplies the recording data b(j, k) to a recording head 21.

As mentioned above, recording points are aligned in a lattice form on a disc surface of a recording disc in a disc tangential direction and in a disc radial direction, and coordinates (j, k) indicate positions of recording points, where "j" indicates the position of a track on the disc surface, and "k" indicates the position of a disc radial line within one track.

The precoder 110 is composed of, for example, a subtractor 111, a mod3 processor 112, and delay elements 113–115. The delay element 113 may comprise, for example, a FIFO (first in first out) memory or the like for providing an input with a delay of a time corresponding to the number of recording data in one track, and outputting the delayed data. Each of the delay elements 114, 115 in turn provides an input with a delay of a time corresponding to one piece of recording data, and outputs the delayed data.

With the configuration described above, the precoder 110 performs the following logical operation on the information data a(j, k) to convert it into the recording data b(j, k):

$$b(j, k) = \{a(j, k) - b(j, k-1) - b(j-1, k) - b(j-1, k-1)\} \bmod 3 \quad (18)$$

where b(j, k): recording data to be recorded at a recording point which exists on a disc radial line k on a recording track j;

b(j, k-1): recording data recorded at a recording point which exists on a disc radial line (k-1) previous to the disc radial line k on the recording track j;

b(j-1, k): recording data recorded at a recording point which exists on the disc radial line k on a recording track (j-1) one track more internal to the recording track j; and b(j-1, k-1): recording data recorded at a recording point which exists on the disc radial line (k-1) previous to the disc radial line k on the recording track (j-1) one track more internal to the recording track j.

"mod" in the above equation is an operator representing a residual operation.

Stated another way, the recording data b(j, k) is a residue which is produced by dividing $\{a(j, k)-b(j, k-1)-b(j-1, k)-b(j-1, k-1)\}$ by three. The recording data b(j, k) therefore takes one of three values "0," "1," "2."

As is apparent from the equation above, in the present invention, not only recording data recorded at the previous recording point but also recording data recorded at two recording points on an adjacent recording track are reflected to recording data to be recorded on a current track.

The recording head 21 irradiates recording laser light corresponding to the ternary recording data b(j, k) onto a recording surface of the recording disc 30 in accordance with the aforementioned pit edge recording scheme.

In the following, description is made on an approach for recording ternary recording data by the pit edge recording in accordance with the SCIPER scheme with reference to FIGS. 16A, 16B.

In the pit edge recording, first, pits Pt each having the same length as the distance T between adjacent recording points (indicated by black circles) are arranged at every other intervals as illustrated in FIG. 16A. Then, a recording track is actually formed with pits each having the positions of a leading edge and a trailing edge shifted in three stages in accordance with the value of corresponding ternary recording data, as illustrated in FIG. 16B. It should be noted that FIG. 16B illustrates an example of recording a sequence of recording data {0, 1, 2, 0, 2, 2, 1, 1} at respective recording points (indicated by black circles) by reducing the pit length when recording data b(j, k) is "0"; maintaining the pit length when recording data b(j, k) is "1"; and shifting a pit edge in the direction of extending the pit length when recording data b(j, k) is "2."

The reproducing head 41 traces an inter-track space between two adjacent recording tracks formed on the recording disc 30 to irradiate reproducing laser light over the two recording tracks, and photoelectrically converts reflected light from the recording tracks to produce a read signal. With such irradiation of the reproducing laser light, a reading beam spot SP is irradiated to a total of four recording points existing on two disc radial lines on the two respective recording tracks mutually adjacent thereto, and a read signal is produced in accordance with the reflected light at the respective recording points.

In this event, when four ternary recording data b(j, k), taking one of the aforementioned "0," "1," "2," are simultaneously read, a nine-value read signal having a value in a range of 0, 1, 2, . . . , 8 is produced.

For example, a possible signal level taken as a read signal is one of 0.4 [V], 0.6 [V], 0.8 [V], 1.0 [V], 1.2 [V], 1.4 [V], 1.6 [V], 1.8 [V] and 2.0 [V] when the irradiation of the reading beam spot SP centers on pits, and one of 0.0 [V], 0.2 [V], 0.4 [V], 0.6 [V], 0.8 [V], 1.0 [V], 1.2 [V], 1.4 [V] and 1.6 [V] when the irradiation of the reading beam spot SP centers on a land.

Thus, a level determining circuit 53 determines the signal level of a read signal as one of 0.4 [V], 0.6 [V], 0.8 [V], 1.0 [V], 1.2 [V], 1.4 [V], 1.6 [V], 1.8 [V] and 2.0 [V] as mentioned above when the irradiation of the reading beam spot SP centers on pits, and determines the signal level of the read signal as one of 0.0 [V], 0.2 [V], 0.4 [V], 0.6 [V], 0.8 [V], 1.0 [V], 1.2 [V], 1.4 [V] and 1.6 [V] when the irradiation of the reading beam spot SP centers on a land.

Determination data c(j, k) thus derived is expressed by:

$$c(j, k)=b(j, k)+b(j, k-1)+b(j-1, k)+b(j-1, k-1) \quad (19)$$

A mod3 processor 61 performs a residual operation as follows on the determination data c(j, k) to produce reproduced information data d(j, k):

$$d(j, k)=c(j, k) \bmod 3 \quad (20)$$

FIGS. 17 and 18 are tables each showing a correspondence relationship between the information data a(j, k), the recording data b(j, k), the determination data c(j, k) and the reproduced information data d(j, k), as mentioned above.

It can be seen from FIGS. 17 and 18 that the information data a(j, k) are coincident with the reproduced information data d(j, k), so that ternary recording data can also be reproduced correctly.

Alternatively, the configuration illustrated in FIG. 14 may employ the Viterbi decoding in a manner similar to the configuration illustrated in FIG. 9.

Also, while in the foregoing embodiment, a single reading beam spot is simultaneously irradiated to a total of four recording points existing on two disc radial lines on two recording tracks, the present invention may also be applied to a recording/reproducing system in which a reading beam spot is simultaneously irradiated to a total of six recording points existing on three disc radial lines on two recording tracks.

Figure 20:
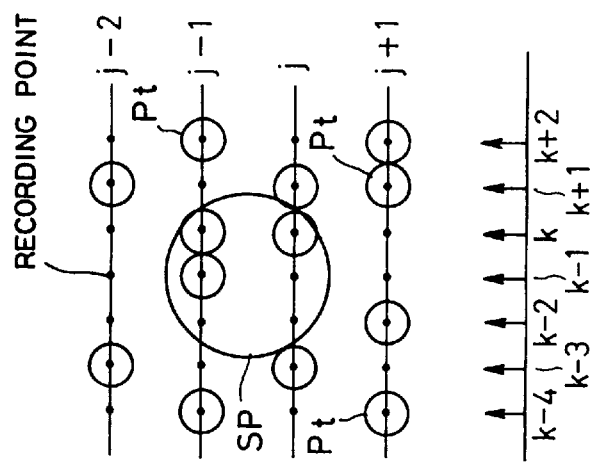
FIG. 20 is an enlarged view of a disc 30 illustrated in FIG. 19.
Figure 19:
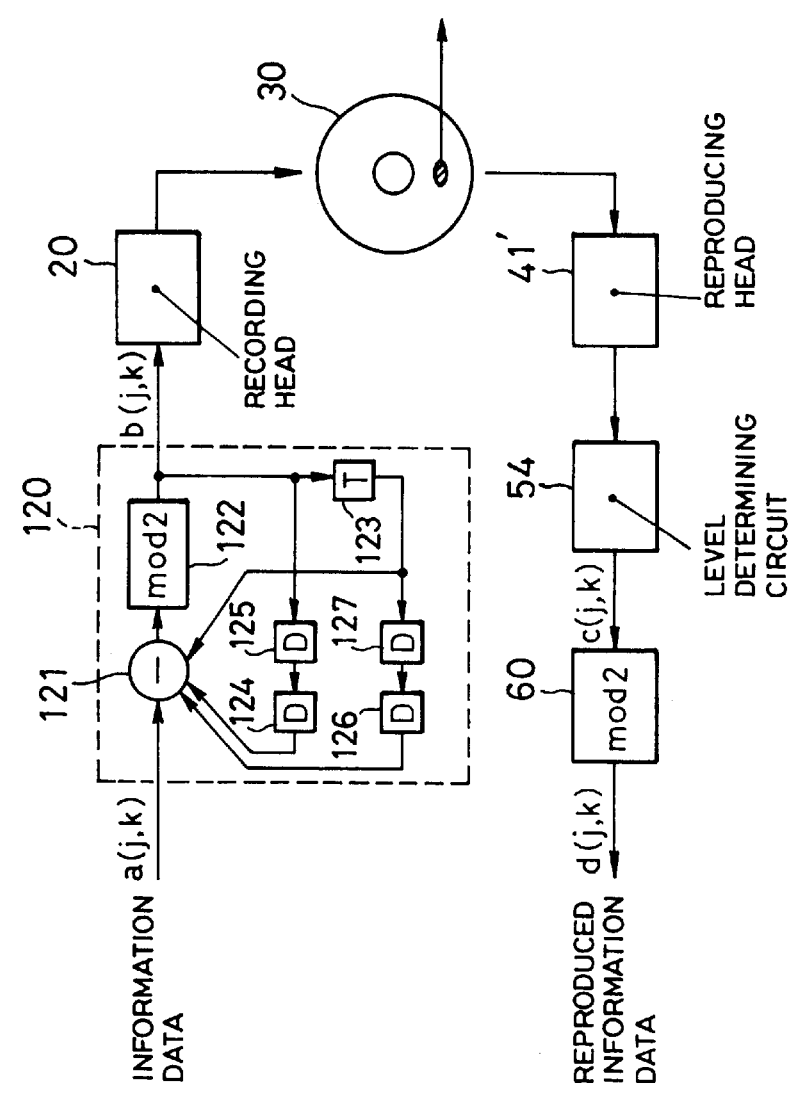
FIG. 19 is a block diagram illustrating the configuration of a recording/reproducing system which may be applied when six recording points are simultaneously irradiated with a reading beam spot.

FIG. 19 illustrates another exemplary configuration of a recording/reproducing system which has been made in view of the modification mentioned above. FIG. 20 is an enlarged view of a disc 30 illustrated in FIG. 19.

The precoder 120 in FIG. 19, which is composed of, for example, a subtractor 121, a mod2 processor 122, and delay elements 123–127, performs the following logical operation on information data a(j, k) to convert it into recording data b(j, k) which is then supplied to a recording head 20.

The delay element 123 may comprise, for example, a FIFO (first in first out) memory or the like for providing an input with a delay of a time corresponding to the number of recording data in one track, and outputting the delayed data. Each of the delay elements 124–127 in turn provides an input with a delay of a time corresponding to one piece of recording data, and outputs the delayed data.

$$b(j, k)=\{a(j, k)-b(j, k-2)-b(j-1, k)-b(j-1, k-2)\} \bmod 2 \quad (21)$$

where b(j, k): recording data to be recorded at a recording point which exists on a disc radial line k on a recording track j;

b(j, k-2): recording data recorded at a recording point which exists on a disc radial line (k-2) two lines previous to the disc radial line k on the recording track j;

b(j-1, k): recording data recorded at a recording point which exists on the disc radial line k on a recording track (j-1) one track more internal to the recording track J; and b(j-1, k-2): recording data recorded at a recording point which exists on the disc radial line (k-2) two lines previous to the disc radial line k on the recording track (j-1) one track more internal to the recording track j, "mod" in the above equation is an operator representing a residual operation.

Stated another way, the recording data b(j, k) is a residue which is produced by dividing {a(j, k)–b(j, k-2)–b(j-1, k)–b(j-1, k-2)} by two.

The recording head 20 irradiates recording laser light corresponding to the recording data b(j, k) onto a recording surface of the recording disc 30 as a recording medium.

Assume herein that so-called pit position recording is performed, where data is recorded at each recording point existing on each recording track of the recording disc 30 as the presence or absence of a pit at each recording point.

For example, the recording head 20 irradiates recording laser light to the position of a recording point on a recording track when the recording data b(j, k) is at logical level "1," and does not irradiate the recording laser light at the position of this recording point when the recording data b(j, k) is at logical level "0." In this event, pits Pt are formed only at the positions of recording points which were irradiated with the recording laser light, and no pits are formed at recording points which were not irradiated with the recording laser light. In this way, the recording disc 30 is formed with a sequence of pits corresponding to the recording data b(j, k) on the recording track.

A reproducing head 41' in a reproducing system traces an inter-track space between two mutually adjacent recording tracks formed on the recording disc 30 to irradiate reproducing laser light over the two recording tracks, and photoelectrically converts reflected light from the recording tracks to produce a read signal. With such irradiation of the reproducing laser light, a reading beam spot SP is irradiated to a total of six recording points existing on three disc radial lines on the two respective recording tracks mutually adjacent thereto, and a read signal is produced in accordance with the reflected light at the respective recording points.

It should be noted that the three recording points on the same track are not irradiated with an equal amount of the reproducing laser light. For example, assuming that the amount of light irradiated to a central recording point is "2," the amount of light irradiated to recording points on the right and left sides is "1." Thus, a read signal for recording data at the central recording point is weighted twice as much as a read signal for recording data on its right and left sides.

The reproducing head 41', therefore, produces a read signal at a level corresponding to the sum derived from a weighted addition of recording data at six recording points, as a result of simultaneously reading information from six recording points with the single reading beam spot SP.

Here, when six binary recording data taking "0" or "1" are simultaneously read, a nine-value read signal having a value in a range of 0 to 8 is produced. Assume, for example, that nine levels of the read signal are distributed about 0 [V], 1/4 [V], 2/4 [V], 3/4 [V], . . . , 7/4 [V], 2 [V] corresponding to these values 0–8, respectively.

A level determining circuit 54 determines which of the nine values a read signal as mentioned above corresponds to, and supplies the mod2 processor 60 with determination data c(j, k) indicative of the determination result.

For example, the level determining circuit 54 compares the voltage of the read signal with each of eight threshold values 1/8V, 3/8V, 5/8V, . . . , 15/8V and samples the comparison result to determine which of the nine levels the read signal falls under.

The determination data c(j, k) thus produced is expressed by:

$$c(j, k)=b(j, k)+2b(j, k-1)+b(j, k-2)+b(j-1, k)+2b(j-1, k-1)+b(j-1, k-2) \quad (22)$$

The mod2 processor 60 performs a residual operation as follows on the determination data c(j, k) to produce reproduced information data d(j, k):

$$d(j, k) = c(j, k) \bmod 2 \qquad (23)$$

FIGS. 21 and 22 are tables each showing a correspondence relationship between each of the recording data b(j, k), the determination data c(j, k) and the reproduced information data d(j, k) produced by the recording/reproducing system illustrated in FIG. 19, based on the information data a(j, k).

It can be seen from FIGS. 21 and 22 that the information data a(j, k) are coincident with the reproduced information data d(j, k), so that information data can be correctly reproduced.

While the recording/reproducing system illustrated in FIG. 19 employs the level determining circuit 54 and the mod2 processor 60, the Viterbi decoding may be employed instead. In addition, while the recording/reproducing system illustrated in FIG. 19 employs the pit position recording scheme, the pit edge recording scheme may be employed instead. Further, while this recording/reproducing system records and reproduces binary information data, ternary information data may be recorded and reproduced instead.

The foregoing embodiments have been described for a particular case where recording points on two mutually adjacent recording tracks are simultaneously read. The present invention, however, is not limited to this case, but may be applied when recording points on three mutually adjacent tracks are simultaneously read. In this case, the reproducing laser light is driven to trace a central recording track.

In essence, the present invention can be implemented when recorded information is read from all recording points (m×n) existing on m disc radial lines (m is a natural number equal to or larger than two) on each of n recording tracks (n is a natural number equal to or larger than 2) including a target recording point at which the recording is to be performed.

Also, while the recording disc 30 is used as a recording medium in the foregoing embodiments, the recording disc 30 may be any material such as a ROM disc, a magneto-optical disc, a magnetic disc, a phase change disc, or the like. The ROM disc is particularly advantageous since it employs reproducing laser light having a larger beam diameter than the beam diameter of recording laser light.

Further, while in the foregoing embodiments, recording and reproducing are performed while a recording disc is driven to rotate in accordance with the CAV scheme, a ZCLV (Zoned Constant Linear Velocity) scheme may be employed instead. This ZCLV scheme divides a recording surface into a plurality of toroidal zones in accordance with its radius, such that recording/reproducing is performed in accordance with the CAV scheme in each zone, while the rotational speed of the recording disc is changed from one zone to another. Since this scheme may also be used to align recording points in a lattice form, the high density recording/reproducing according to the present invention can be accomplished. Further, since this scheme does not suffer from a reduced recording density on an outer peripheral portion of a disc, as is the case of the CAV scheme, it is possible to increase the recording capacity of the entire recording disc.

What is claimed is:

1. An information data recording method for recording an M-value information data at recording points interspersed on recording tracks of a recording disc, wherein (m×n) recording points exist on n adjacent recording tracks (n is a natural number equal to or larger than two) including a target recording point and exist on m adjacent disc radial lines (m is a natural number equal to or larger than two) including said target recording point, said method comprising the steps of:

subtracting each of recording data recorded at each of (m×n−1) recording points other than said target recording point, within said (m×n) recording points, from said information data to produce a subtraction result;

performing a residual operation on said subtraction result with the value of M to derive a residue value; and recording said residue value as recording data to be recorded at said target recording point.

2. An information data reproducing method for reproducing recorded information data from a recording disc on which M-value information data is recorded at each of a plurality of recording points interspersed on recording tracks, said method comprising the steps of:

simultaneously reading recorded information from (m×n) recording points existing on n adjacent recording tracks (n is a natural number equal to or larger than two) and existing on m disc radial lines (m is a natural number equal to or larger than two) to produce a read signal; and recovering said information data recorded at one recording point within said (m×n) recording point, based on said read signal, to derive reproduced information data.

3. An information data recording method for recording binary information data at recording points interspersed on recording tracks of a recording disc, comprising the steps of:

calculating a recording data b(j, k) to be recorded at a target recording point existing on a recording track j and existing on a disc radial line k from:

information data a(j, k) corresponding to said target recording point;

recording data b(j, k-1) recorded at a recording point existing on a disc radial line (k-1) adjacent to said disc radial line k on said recording track j;

recording data b(j-1, k) recorded at a recording point existing on said disc radial line k on a recording track (j-1) adjacent to said recording track j; and recording data b(j-1, k-1) recorded at a recording point existing on said disc radial line (k-1) on said recording track (j-1), with the following logical equation:

$$b(j, k) = \{a(j, k) - b(j, k-1) - b(j-1, k) - b(j-1, k-1)\} \bmod 2$$

where mod represents a residual operation; and recording said recording data b(j, k) at said target recording point.

4. An information data reproducing method for reproducing recorded information from a recording disc on which binary information data is recorded at each of a plurality of recording points interspersed on recording tracks, said method comprising the steps of:

producing a read signal by simultaneously reading:

recording data b(j, k) recorded at a recording point existing on a disc radial line k on a recording track j;

recording data b(j, k-1) recorded at a recording point existing on a disc radial line (k-1) adjacent to said disc radial line k on said recording track j;

recording data b(j-1, k) recorded at recording point existing on said disc radial line k on a recording track (j-1) adjacent to said recording track j; and recording data b(j-1, k-1) recorded at a recording point existing on said disc radial line (k-1) on said recording track (j-1);

determining whether said read signal is 0, 1, 2, 3, or 4 within five-value data to produce a determination result;

performing a residual operation on said determination result with two to derive a residue value; and outputting said residue value as reproduced information data.

5. An information data reproducing method for reproducing recorded information from a recording disc on which M-value information data is recorded at each of a plurality of recording points interspersed on recording tracks, said method comprising the steps of:

simultaneously reading recorded information from (m×n) recording points existing on n adjacent recording tracks (n is a natural number equal to or larger than two) and existing on m adjacent disc radial lines (m is a natural number equal to or larger than two) to produce a read signal;

performing Viterbi decoding on said read signal to recover said information data recorded at one of said (m×n) recording points; and outputting said information data as reproduced information data.

6. An information data recording/reproducing method for recording M-value information data at recording points interspersed on recording tracks of a recording disc, and reproducing said information data, wherein (m×n) recording points exist on n adjacent recording tracks (n is a natural number equal to or larger than two) including a target recording point and exist on m adjacent disc radial lines (m is a natural number equal to or larger than two) including said target recording point, said method, when recording information data on said recording disc, comprising the steps of:

subtracting each of recording data recorded at each of (m×n−1) recording points other than said target recording point, within said (m×n) recording points, from said information data to derive a subtraction result;

performing a residual operation on said subtraction result with the value of M to derive a residue value; and recording said residue value at said target recording point, and said method, when reproducing information data from said recording disc, comprising the steps of:

simultaneously reading recorded information from (m×n) recording points existing on n adjacent recording tracks (n is a natural number equal to or larger than two) and existing on m adjacent disc radial lines (m is a natural number equal to or larger than two) to produce a read signal;

performing Viterbi decoding on said read signal to recover said information data recorded at one recording point within said (m×n) recording points; and outputting said recovered information data as reproduced information data.

7. An information data recording/reproducing method according to claim 6, wherein said M, n and m are two, respectively, and wherein said step of performing the Viterbi decoding comprises:

calculating five branchmetrics using five possible values taken as signal levels of said read signal as predicted values;

calculating three pathmetrics based on said branchmetrics; and outputting, as said reproduced information data, a decoded data sequence selected from three data sequences while updating each of said three data sequences based on each of said pathmetrics.

8. An information data recording/reproducing method for recording binary information data at recording points interspersed on recording tracks on a recording disc, and reproducing said binary information data, said method, when recording information data on said recording disc, comprising the steps of:

calculating a recording data b(j, k) to be recorded at a target recording point existing on a recording track j and existing on a disc radial line k from:

information data a(j, k) corresponding to said target recording point;

recording data b(j, k-1) recorded at a recording point existing on a disc radial line (k-1) adjacent to said disc radial line k on said recording track a;

recording data b(j-1, k) recorded at a recording point existing on said disc radial line k on a recording track (j-1) adjacent to said recording track j; and recording data b(j-1, k-1) recorded at a recording point existing on said disc radial line (k-1) on said recording track (j-1), with the following logical equation:

$$b(j, k) = \{a(j, k) - b(j, k-1) - b(j-1, k) - b(j-1, k-1)\} \bmod 2$$

where mod represents a residual operation; and recording said recording data b(j, k) at said target recording point, and said method, when reproducing information data from said recording disc, comprising the steps of:

simultaneously reading said recording data b(j, k), said recording data b(j, k-1), said recording data b(j-1, k) and said recording data b(j-1, k-1) to produce a read signal;

performing Viterbi decoding on said read signal to recover said information data a(j, k); and outputting said recovered information data as reproduced information data.

9. An information data recording/reproducing method according to claim 8, wherein said step of performing the Viterbi decoding comprising the steps of:

calculating five branchmetrics using five possible values taken as signal levels of said read signal as predicted values;

calculating three pathmetrics based on said branchmetrics; and outputting, as said reproduced information data, a decoded data sequence selected from three data sequences while updating each of said three data sequences based on each of said pathmetrics.

* * * * *